(12) United States Patent
Lynam

(10) Patent No.: US 9,031,213 B2
(45) Date of Patent: *May 12, 2015

(54) METHOD AND APPARATUS TO VALIDATE A SUBSCRIBER LINE

(71) Applicant: Heritage Secure E-Commerce, LLC, Tyler, TX (US)

(72) Inventor: Joe M. Lynam, Morgan Hill, CA (US)

(73) Assignee: Heritage Secure E-Commerce, LLC, Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,781

(22) Filed: Feb. 6, 2014

(65) Prior Publication Data
US 2014/0222679 A1 Aug. 7, 2014

Related U.S. Application Data

(63) Continuation of application No. 13/860,085, filed on Apr. 10, 2013, now Pat. No. 8,666,045, which is a continuation of application No. 13/078,371, filed on Apr. 1, 2011, now Pat. No. 8,681,956, which is a continuation of application No. 12/916,891, filed on Nov. 1, 2010, now Pat. No. 8,379,815, which is a continuation of application No. 11/836,603, filed on Aug. 9, 2007, now Pat. No. 7,848,500, which is a continuation of application No. 11/400,737, filed on Apr. 6, 2006, now Pat. No. 7,848,504, which is a continuation of application No. 10/225,098, filed on Aug. 20, 2002, now Pat. No. 7,054,430.

(60) Provisional application No. 60/314,604, filed on Aug. 23, 2001.

(51) Int. Cl.
*H04M 15/00* (2006.01)
*G06Q 20/40* (2012.01)
*H04M 3/38* (2006.01)
*G06Q 20/30* (2012.01)
*G06Q 20/32* (2012.01)
*H04M 3/42* (2006.01)

(52) U.S. Cl.
CPC ............ *G06Q 20/4014* (2013.01); *H04M 3/38* (2013.01); *H04M 3/42068* (2013.01); *H04M 15/00* (2013.01); *H04M 15/41* (2013.01); *H04M 15/51* (2013.01); *H04M 15/68* (2013.01); *H04M 15/70* (2013.01); *H04M 15/73* (2013.01); *H04M 15/88* (2013.01); *H04M 2215/0116* (2013.01); *H04M 2215/0164* (2013.01); *H04M 2215/0196* (2013.01); *H04M 2215/54* (2013.01); *H04M 2215/70* (2013.01); *H04M 2215/7072* (2013.01); *G06Q 20/40* (2013.01); *G06Q 20/305* (2013.01); *G06Q 20/3224* (2013.01); *G06Q 20/325* (2013.01)

(58) Field of Classification Search
USPC ............... 379/93.01, 142.01, 127.01, 127.02, 379/127.04, 127.05, 220.01, 207.15, 379/114.27, 127.06
See application file for complete search history.

(56) References Cited

U.S. PATENT DOCUMENTS 5,003,584 A * 3/1991 Benyacar et al. ............. 379/119

* cited by examiner

*Primary Examiner* — Thjuan K Addy
(74) *Attorney, Agent, or Firm* — Ascenda Law Group, PC

(57) ABSTRACT

A method of providing validation data associated with a subscriber line of a telecommunication network. The method includes obtaining line data of the subscriber line wherein the line data is suitable for interrogating a line identification database (LIDB). The method interrogates the LIDB with the line data to obtain reference subscriber data associated with the line data, and processes the reference subscriber data to obtain validation data associated with the subscriber line. The invention extends to a subscriber line validation system to validate a subscriber line of a communication network.

20 Claims, 7 Drawing Sheets

| Account Number | Statement Date<br>Dec 4, 2002 | Page 1 |
|---|---|---|
| Questions about your bill? | 1-800-000-0000 | |

XYZ

| Total Current Charges (See detail below) | $106.11 |
|---|---|

Billed on Behalf of BlueLight.com

| Description | Amount: |
|---|---|
| 1. Dec 3 BLUELIGHT ISP ACCESS | $9.91 |
| 2. Dec 3 ONLINE SERVICE | $4.91 |
| 3. Dec 3 DSL LINE CHARGE | $29.91 |
| 4. Dec 3 UNIFIED MESSAGING | $5.95 |
| 5. Dec 3 WEB HOSTING | $20.00 |
| Total Monthly Chargers | $70.80 |

Billed on Behalf of INTERNET TELEPHONY PROVIDER

| | Date | Time | Place and Number Called | Type | Rate | Minutes | Amount |
|---|---|---|---|---|---|---|---|
| 6. | Nov.8 | 3:37 pm | Anywhere, USA 444 555-7777 | Direct | Day | 6 | .42 |
| 7. | Nov.10 | 3:37 pm | Anywhere, USA 444 555-7777 | Direct | Day | 10 | .70 |
| 8. | Nov.14 | 3:37 pm | Anywhere, USA 444 555-7777 | Direct | Day | 7 | 1.61 |
| 9. | Nov.16 | 3:37 pm | Anywhere, USA 444 555-7777 | Direct | Day | 23 | .49 |
| 10. | Nov.21 | 3:37 pm | Anywhere, USA 444 555-7777 | Direct | Day | 50 | 3.92 |
| TotalCalls | | | | | | | $7.14 |

Billed on Behalf of INTERNET SERVICE PROVIDER

| 11. | Nov.14 | 2:32 pm | Online Games | 444 555-7774 | Direct | Day | 1 | $6.00 |
|---|---|---|---|---|---|---|---|---|
| 12. | Nov.16 | 2:37 pm | Software | 444 555-7771 | Direct | Day | 1 | $14.95 |
| 13. | Nov.21 | 5:17 pm | MPS Smooth Jazz | 444 555-7772 | Direct | Eve | 1 | $8.99 |
| TotalCalls | | | | | | | | $24.94 |

Taxes & Surcharges
Description

| | Ammount |
|---|---|
| 14. Charges for Network Access for Interstate Calling. Imposed by Federal Communications Commission | $3.50 |

Fig. 6

METHOD AND APPARATUS TO VALIDATE A SUBSCRIBER LINE

The present application is a continuation of U.S. patent application Ser. No. 13/860,085, filed Apr. 10, 2013, which is a continuation of U.S. patent application Ser. No. 13/078,371, filed on Apr. 1, 2011, which is a continuation of U.S. patent application Ser. No. 12/916,891, filed on Nov. 1, 2010, which issued as U.S. Pat. No. 8,379,815, which is a continuation of U.S. patent application Ser. No. 11/836,603, filed on Aug. 9, 2007, which issued as U.S. Pat. No. 7,848,500, which is a continuation of U.S. patent application Ser. No. 11/400,737, filed Apr. 6, 2006, which issued as U.S. Pat. No. 7,848,504, which is a continuation of U.S. patent application Ser. No. 10/225,098, filed Aug. 20, 2002, which issued as U.S. Pat. No. 7,054,430, which claims the benefit of the filing date of U.S. Provisional Patent Application No. 60/314,604, filed Aug. 23, 2001.

BACKGROUND TO THE INVENTION

An increasing number of vendors are offering goods and/or services which may be purchased via a communication network such as a telecommunication network. For example, the customer may conduct a transaction via a subscriber line using a landline telephone or a personal computer. Conventionally, credit or debit card details are furnished by the customer to the vendor to effect payment for the goods and/or services. As many customers are hesitant to supply credit or debit card details over a communication network, an alternate method of payment would be advantageous. However, if an alternate method is used, verification of the payment method should preferably take place prior to concluding the transaction.

SUMMARY OF THE INVENTION

In accordance with the invention, there is provided a method to provide validation data associated with a subscriber line of a telecommunication network, the method including:
obtaining line data of the subscriber line, the line data being suitable for interrogating a line identification database (LIDB);
interrogating the LIDB with the line data to obtain reference subscriber data associated with the line data; and
processing the reference subscriber data to obtain validation data associated with the subscriber line.

The LIDB may be a conventional LIDB used by a service provider, e.g. a local exchange carrier, to investigate a destination or termination line to which a carrier requests a connection.

The method may include analyzing the reference subscriber data to determine if the data is associated with a billing telephone number (BTN) and, if so, generating an approval or a decline status. In one exemplary embodiment, the line data is automatic number identification (ANI) data and, the method includes interrogating the LIDB using the ANI data (herein also referred to as the ANI). The validation data may be processed to determine whether the subscriber line is a billable line having an associated account to which goods or services can be billed.

The reference subscriber data received from the LIDB may be processed selectively to approve a transaction requested via the subscriber line. In one exemplary embodiment, the reference subscriber data is in the form of conventional LIDB codes and the operation to process the data may include generating a modified code from at least one LIDB code. In certain embodiments, a common modified code is generated from a plurality of LIDB codes. The modified codes may be arranged in a billable group and a non-billable group.

The method may include conducting fraud control checks on the account associated with the subscriber line number or ANI. The fraud control checks may include at least one of the operations selected from the group consisting of checking if adjustments have been made to the account associated with the ANI, verifying a user entered ZIP code with ZIP data from a ZIP data source, verifying user entered address data with address data from an address data source, checking if the area code associated with the ANI has changed, checking if the ANI and the BTN match, and checking if the BTN or ANI are missing from the record.

The method may include interrogating a network database with the ANI to determine if the subscriber line is a billable subscriber line and, if not, generating a decline status. The method may include interrogating with the line data at least one of a competitive local exchange carrier (CLEC) database, a 42 BLOCK database, a Block and Cancel database, an unpaid bills database, an off network database, an on network database, an address verification database, a regional account office (RAO) database, an operating company number (OCN) database, and a customer account record exchange (CARE) database and selectively generating one of a decline status and an approved status in response to the interrogation.

The method may include receiving the line data from a vendor of goods or services (e.g. an Internet Service Provider (ISP)); and communicating at least the decline status to the vendor.

In one exemplary embodiment, the charges raised by the vendor are included in an account submitted by the exchange carrier to a subscriber for use of the subscriber line.

Further in accordance with the invention, there is provided a computer-readable medium for storing a set of instructions that, when executed by a machine, cause the machine to execute the method.

Still further in accordance with the invention, there is provided a subscriber line validation system for validating a subscriber line of a communication network, the system including:
a communication module for receiving line data of the subscriber line, the line data being suitable for interrogating a line identification database (LIDB);
an interrogation module for interrogating the LIDB with the line data to obtain reference subscriber data associated with the line data; and
a processor module for processing the reference subscriber data to obtain validation data associated with the subscriber line.

In one exemplary embodiment, the LIDB is a conventional LIDB. However, in other embodiments, a plurality of LIDBs may be provided that are used by one or more service providers, e.g. local exchange carriers, to investigate a destination or termination line to which a subscriber line requests a connection.

In one exemplary embodiment, the processor module is configured to analyze the reference subscriber data to determine if the data is associated with a billing telephone number (BTN) and, if so, the system generates a decline status. In one embodiment, the line data is automatic number identification (ANI) data and the processor module interrogates the LIDB using the ANI data.

The validation data may be processed to determine if the subscriber line is a billable line having an associated account to which goods or services can be billed.

The reference subscriber data may be received from the LIDS and may be processed selectively to approve a transaction requested via the subscriber line.

The reference subscriber data is preferably in the form of conventional LIDB codes and the processor module may generate a modified code from at least one LIDB code. In certain embodiments, the processor module generates a common modified code from a plurality of different LIDS codes. In one embodiment, the modified codes are arranged in a billable group and a non-billable group.

In certain embodiments, the system may conduct fraud control checks on an account associated with the ANI. The processor module may be configured to conduct at least one fraud control check selected from the group consisting of checking if adjustments have been made to the account associated with the ANI, verifying a user entered ZIP code with a ZIP data source, verifying user entered address data with an address data source, checking if the area code associated with the ANI has changed, checking if the ANI and the BTN match, and checking if the BTN or ANI are missing from the record.

The processor module may interrogate a network database with the ANI to determine if the subscriber line is a billable subscriber line and, if so, generate a decline status.

In certain embodiments, the system may interrogate at least one of a competitive local exchange carrier (CLEC) database, a 42 BLOCK database, a Block and Cancel database, an unpaid bills database, an off network database, an on network database, an address verification database, a regional account office (RAO) database, an operating company number (OCN) database, and a customer account record exchange (CARE) database.

The system may include receiving the line data from a vendor of goods or services; and communicating at least the decline status to the vendor. Charges raised by the vendor may be included in an account submitted by the exchange carrier to a subscriber for use of the subscriber line.

Further in accordance with the invention, there is provided a system to provide validation data associated with a subscriber line of a telecommunication network, the system including means for obtaining line data of the subscriber line, the line data being suitable for interrogating a line identification database (LIDB); means for interrogating the LIDB with the line data to obtain reference subscriber data associated with the line data; and means for processing the reference subscriber data to obtain validation data associated with the subscriber line.

BRIEF DESCRIPTION OF THE DRAWINGS

The invention is now described, by way of example, with reference to the accompanying diagrammatic drawings.

In the drawings,

FIG. 6 shows a schematic representation of a sample telephone bill platform which the system can automatically update.

DETAILED DESCRIPTION

Figure 5:
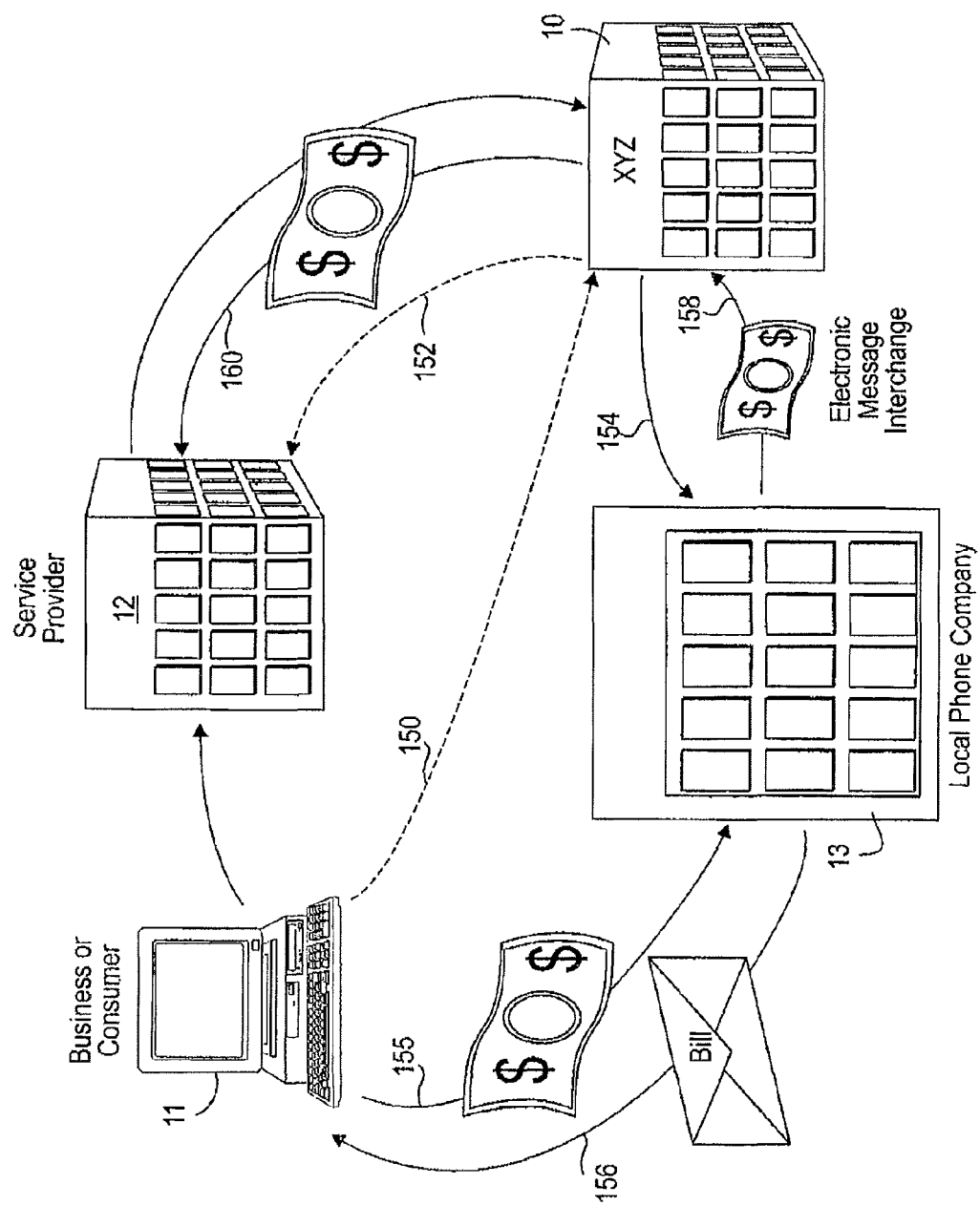
FIG. 5 shows a schematic block diagram of how the system may be used in a conventional commercial environment.

Referring to the drawings, reference number 10 generally indicates an exemplary subscriber line validation system, in accordance with an aspect of the invention, for validating a subscriber line 17 of a subscriber. In one exemplary embodiment, the subscriber line 17 is a telephone line or the like which a consumer or business 11 (see FIGS. 1 and 5) obtains from a telephone company (Telco) 13 or a local exchange carrier (LEC). As described in more detail below, the system 10 uses line data in the exemplary form of an automatic number identification (ANI) service to obtain the telephone line number of the subscriber line 17 thereby to validate the subscriber line 17 when the subscriber line 17 initiates a communication or connection. In one exemplary embodiment, the line number obtained from the ANI service is used to investigate various databases to obtain, for example, an indication of the credit worthiness of the subscriber account associated with the subscriber line 17. It is to be appreciated that any electronic apparatus, e.g. a personal computer, PDA, cellular telephone, or the like may be used to initiate the communication.

Figure 1:
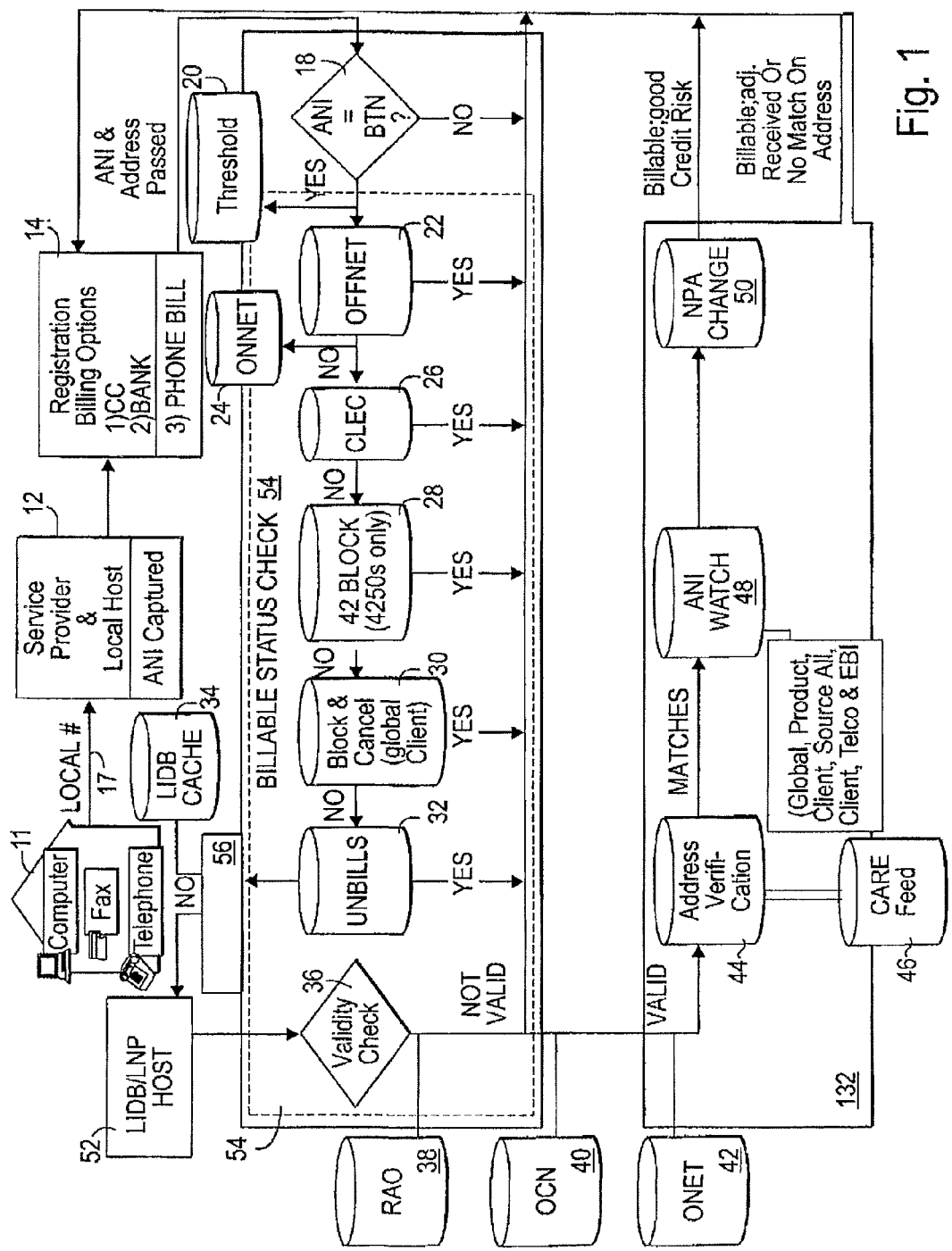
FIG. 1 shows a schematic block diagram of a subscriber line validation system, in accordance with the invention, for validating a subscriber line of a communication network.

Referring in particular to FIG. 1 of the drawings, the system 10 includes an application program interface (API) 14 which is connected to a vendor 12 or service provider (see also FIG. 5) of goods and/or services which requires validation of a subscriber account. The vendor 12, which could for example be an Internet Service Provider, may request the validation of the subscriber line 17 prior to concluding an electronic transaction with a subscriber (e.g., a consumer or business 11) via the subscriber line 17. It is, however, to be appreciated that the API 14 may be connected to a variety of different hosts or clients which require validation of a subscriber line via which the vendor may carry out transactions for goods and/or services.

In one exemplary embodiment, the system 10 is connected to a plurality of vendors which conduct transactions with users via line termination equipment such as a telephone, a personal computer or the like. Such vendors, when conducting transactions, may preferably charge a user for their services by adding such charges to a telephone account of the user rather than charging the goods and/or services to a credit card, debit card, or the like. Accordingly, the validation of the subscriber line 17, and the subscriber account associated with the subscriber line 17, may be of benefit to the vendor 12 prior to completing a transaction. The validation may include determining whether or not the subscriber line 17, via which the communication is made to the vendor, is a billable line and, accordingly, the subscriber account associated with the subscriber line 17 may thus be billed for the transaction.

In one exemplary embodiment, the vendor 12 communicates a request to the system 10 and forwards the subscriber line number, determined by the ANI service, to the system 10 via its API 14. The system 10 then processes the information received from the vendor 12 and provides a validation status, e.g. a code indicating a valid billable number or a code indicating that the subscriber line number is not a valid billable number (e.g. unbillable or non-billable). In particular, a plurality of codes associated with various statuses of the subscriber line 17 may be communicated to the vendor 12 as described in more detail below.

The system 10 includes hardware and software to implement the invention. In the exemplary embodiment, the system 10 includes a comparator module 18, a threshold database 20, an OFFNET database 22, an ONNET database 24, a competitive local exchange carrier (CLEC) database 26, a 42 BLOCK database 28, a block and cancel database 30, an unbilled and/or unpaid bills database 32, line identification database (LIDB) short term cache 34, a validity check module 36, a regional account office (RAO) database 38, an operating company number (OCN) database 40, an ONNET database 42, an address verification database 44, a customer account record exchange (CARE) results database 46, an ANI watch database 48, and an NPA (Numbering Plan Area) exchange database 50. It is to be appreciated that, in less sophisticated embodiments of the invention, all of the above databases need not be included. However, for enhanced accuracy, all of the above databases are preferably included. Further databases may also be included to further enhance the reliability of the validation process.

In addition to any one or more of the above databases, the system 10 is in communication via a conventional communication channel with an off-site or, in some embodiments, on-site line identification database (LIDB) host 52. The LIDB host 52 may include a line number portability (LNP) database. In one exemplary embodiment, the LNP database may front end access to a plurality of industry standard LIDBs (e.g. 13 different LIDBs). The LNP database may however be a separate database. As described in more detail below, the system 10 communicates the subscriber line number to the LIDB host 52 which, in turn, communicates reference subscriber data in the form of industry standard LIDB codes back to the system 10 for processing. The system 10 then processes the LIDB codes to provide the vendor with validation data relating to the subscriber line 17. Unlike conventional LIDB applications which use LIDB to make decisions regarding destination subscriber lines or call completion decisions, e.g. decisions for calling cards, collect and third party toll services or the like, the system 10 may be used to identify telephone numbers being served by CLECs in order to ensure that calls are routed correctly on ported lines.

Broadly, the system 10 has a variety of different components, including a communication module defined by the API 14, and a processor module 54. The a processor module 54 includes the various databases 20 to 32 as well as the comparator module 18 and the validity check module 36, and an interrogation module 56 for interrogating the LIDS host 52. It is to be appreciated that the aforementioned modules may be defined by one or more servers with associated databases. Further, in the drawings, the LIDB host 52 is shown as a single database but may comprise many different LIDB databases maintained by various LECs and, accordingly, may be located at various different geographic locations.

Figure 2:
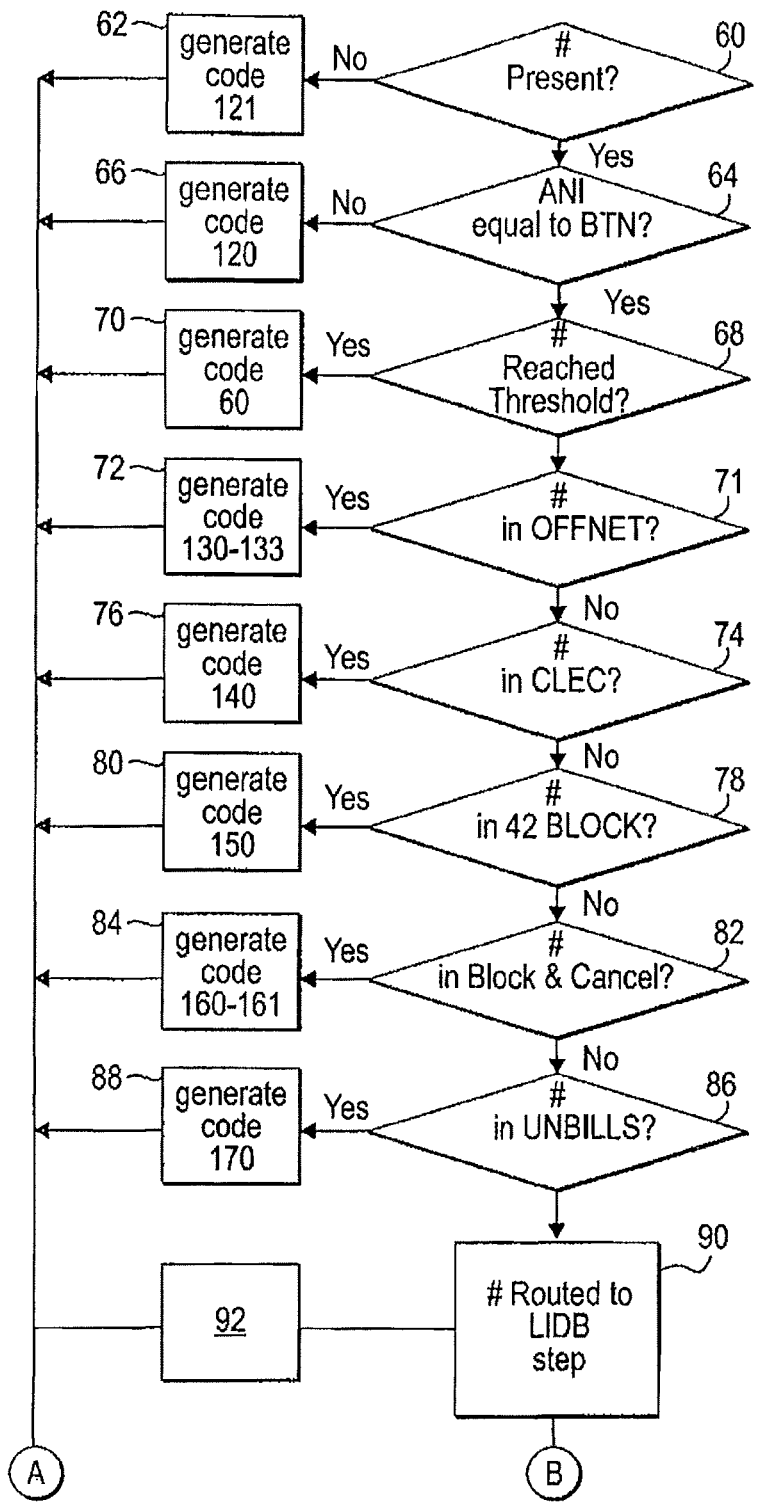
FIGS. 2 to 4 show a schematic flow chart of a method, in accordance with the invention, for validating the subscriber line.
Figure 3:
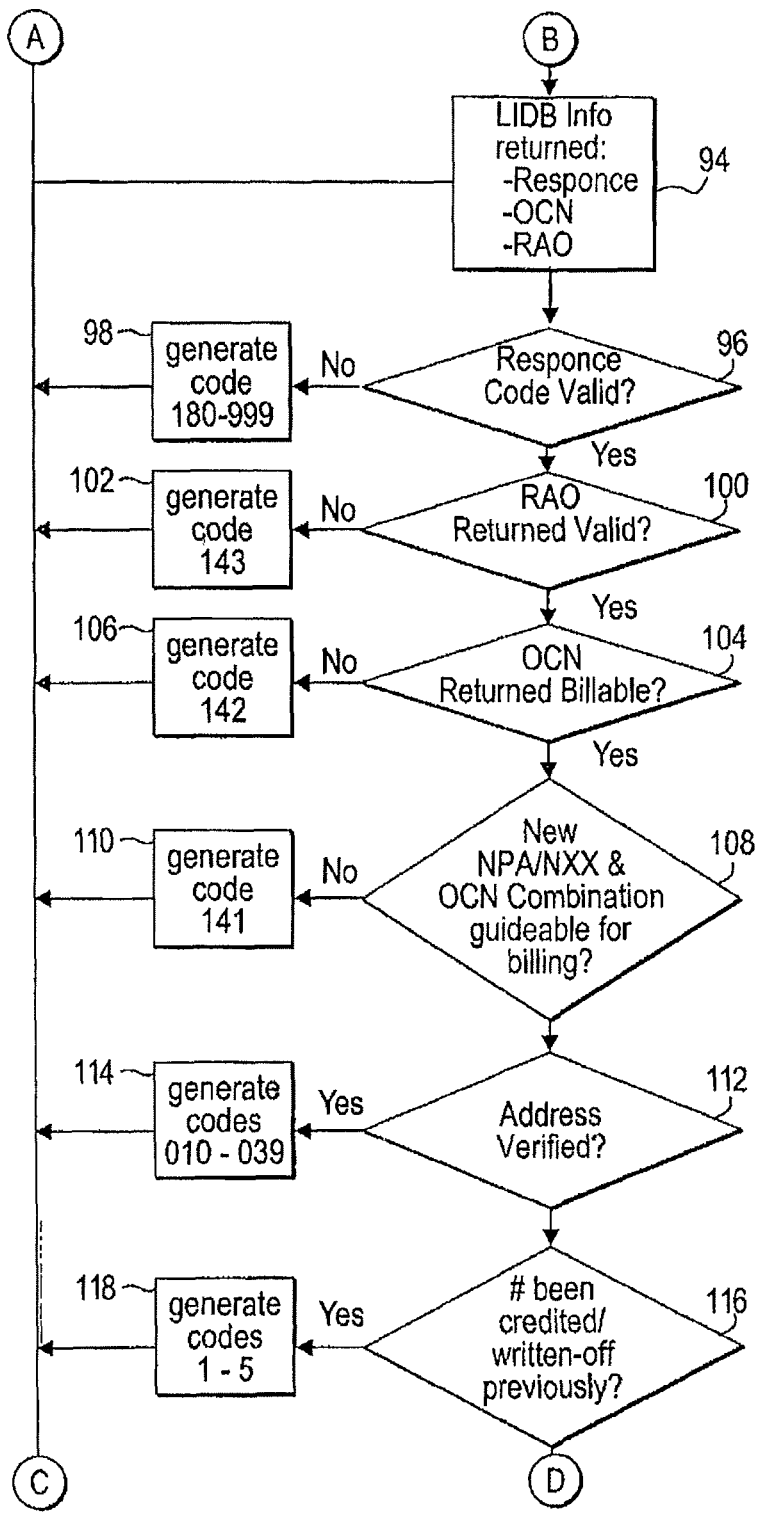
Figure 4:
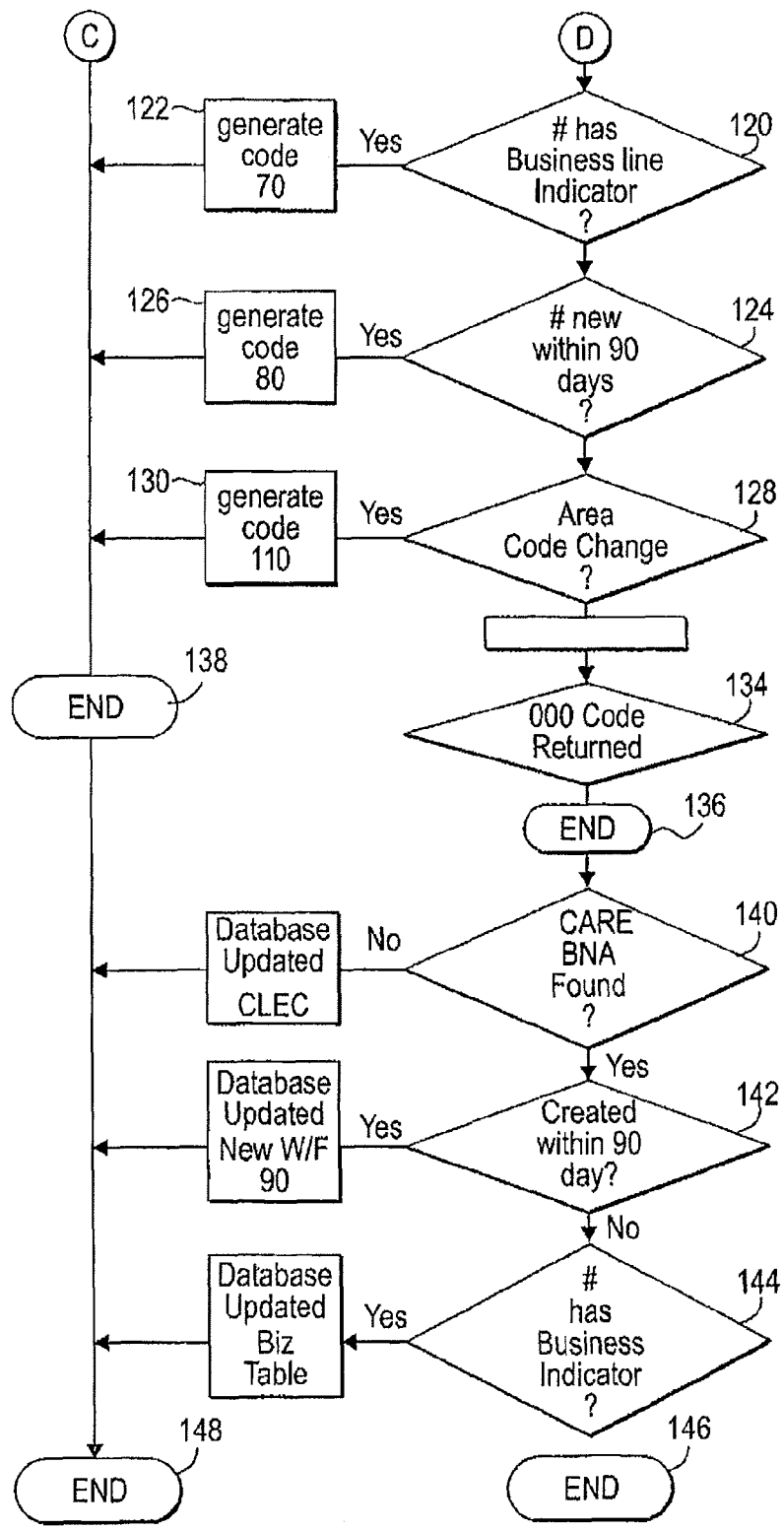

Referring in particular to FIGS. 2 to 4 of the drawings, a flow chart describing the method of operation of the system 10 is shown. In one exemplary embodiment, a vendor 12 initiates a request to the system 10 to validate a subscriber line 17 via which the vendor 12 wishes to transact with a customer (consumer or business 11). As shown at operation 60, the system 10 first checks to see if the subscriber line number is present in the request from the vendor 12 and, if no line number is present, a return code 121 is generated and communicated to the vendor as shown at operation 62. The code 121 indicates to the vendor that the system 10 is unable to process the request. If, however, the subscriber line number is present in the request from the vendor 12, the system 10 then checks if the subscriber line number captured (hereinafter also referred to as the ANI) and a billing telephone number (BTN) match, as shown at operation 64 (see also the comparator module 18 in FIG. 1). In one exemplary embodiment, the BTN may be sourced from the consumer or customer 11 when a transaction is requested by the customer 11. If, however, the ANI and the BTN do not match, then the processor module 54 generates a code 120 (see operation 66) to indicate that the caller and the owner of the line number are not the same person (e.g. subscriber inputs a BTN and calls from a different ANI) and the relevant modified code is then returned to the vendor 12. If the ANI and the BTN do match, the processor module 54 interrogates the threshold database 20 (see operation 68) to ascertain whether or not the line number has reached its threshold (e.g., a predefined client threshold parameter such as an account threshold indicating a maximum dollar amount that may be charged to the account). If the line number has reached its threshold, the processor module 54 then generates a code 60, as shown at operation 70, which is then communicated to the vendor 12 to indicate that the line number should not be granted service. In other words, the subscriber account cannot be billed for the goods or services requested by the customer 11 from the vendor 12.

If the threshold for the particular subscriber line 17 has not been reached, the system 10 may then interrogate its OFFNET database (see operation 71) to check if the industry standard NPA/NXX and operating company number (OCN) of the subscriber line 17 is present in the OFFNET database 22. The OFFNET database 22 includes NPA/NXX and OCN combinations of operating companies with which the proprietor or user of the system 10 does not have billing and collection agreements to bill into the telephone company's or Telco's bill page associated with the subscriber line 17. Accordingly, the proprietor or user of the system 10 is unable to include a charge in the account associated with the subscriber line 17 on behalf of the vendor 12 for the transaction carried out with the vendor 12 via the subscriber line 17.

If the line number is in the OFFNET database 22, then the processor module 54 generates codes 130 to 133 (see operation 72) and communicates these codes to the vendor 12. The codes 130 to 133 indicate that the NPA/NXX and OCN for the particular line number 17 are not billable and, accordingly, charges for goods and/or services requested by a customer 11 via the subscriber line 17 cannot be included in a monthly account or the like by the system 10. As shown in Table 2 below, the codes 130 to 133 provide an indication to the vendor 12 why the subscriber line 17 is not billable or deliverable. If the subscriber line number is not included in the OFFNET database 22, a check is conducted to see whether or not the subscriber line number is included in the ONNET database 24. This check is however optional in the embodiment depicted in the drawings, but in certain embodiments, may be mandatory if the system 10 does not include the OFFNET database 22.

Thereafter, as shown in operation 78, the processor module 54 checks to see if the line number 17 is found in a known CLEC table in the CLEC database 26. CLEC numbers are those line numbers that are known to have ported to a CLEC and, accordingly, the proprietor of the system 10 is thus unable to route these line numbers to the correct billing entities. If the line number is found in the CLEC database 26, then the processor module 54 generates a code 140 (see operation 76), which is communicated to the vendor 12. The code 140 indicates that the line number is not billable for the CLEC and the system 10 can thus not charge the transaction to the subscriber account associated with the subscriber line 17.

If the line number is not found in the CLEC database 26, then the system 10 may check to see if the subscriber of the line number has requested a 4250 billing block as shown at operation 78. In particular, the processor module 54 interrogates the 42 BLOCK database 28 and, if the number is located in the database 28, which indicates that monthly recurring charges (4250 charges) are prevented from being billed to that line number, the processor module 54 generates a code 150 (see operation 80) which is communicated to the vendor 12 to indicate that billing to the particular subscriber line 17 has been blocked.

If, however, the subscriber line 17 has not been blocked, the system 10 may then check at operation 82 if the line number is located in the block and cancel database 30 and, if so, the processor module 54 generates codes 160 and 161 which are then communicated to the vendor 12 as shown at operation 84. The block and cancel database 30 includes requests from owners of subscriber lines, agencies, businesses, or the like that a service be canceled or blocked from further billing. Thereafter, the system 10 may interrogate the unbilled and/or unpaid bills database 32, as shown at operation 86, to check if there is a history of any unpaid bills and/or unbillable bills associated with the subscriber line 17. Unbillable bills relate to those subscriber line numbers where previous attempts have been made to bill charges to the subscriber account associated with the subscriber line number 17, and which have been returned as unbillable. If the processor module 54 locates the subscriber line number in the unbillable and/or unpaid bills database 32 then, as shown at operation 88, a code 170 is generated and communicated to the vendor 12 to indicate that the subscriber line number was previously found to be unbillable and is still considered to be unbillable.

The processing described in the abovementioned operations may conduct a preliminary investigation into the subscriber line number or ANI to provide an initial indication of whether or not the ANI corresponds with a billable subscriber line. Once the initial investigation has been conducted in certain embodiments, the system 10 then uses the ANI to obtain reference subscriber line data in the form of LIDB codes from one or more industry standard databases, e.g. the LIDB host or database 52. Examples of the LIDB codes used in the system 10 are shown in Table 3 below.

As shown at operation 90, if the ANI is not found in the LIDB database 52, then the system 10 cannot provide any validation data to the vendor 12 on this subscriber line and an appropriate code is then communicated to the vendor as shown at block 92.

Once the LIDS database or host 52 has been interrogated, it returns industry standard LIDB codes and line number portability (LNP) data to the system 10 as shown in operation 94. The LIDB codes may then be mapped or translated by the processor module 54 into modified validation codes (see Table 3 which provide relevant validation information to the vendor 12. As can be seen from Table 3, the same modified validation code can be generated from a plurality of different LIDB codes. Once the LIDB information codes have been returned to the processor module 54, the LIDB codes, including an OCN and RAO response codes, are fed into the validity check module 36 as shown at operation 96.

As mentioned above, the LIDB host 52 may also provide LNP data to the system 10. The LNP data is used to identify subscriber line numbers that have ported to a CLEC. If a subscriber line has been ported to a CLEC, the billing ONNET status of the CLEC may be verified in the CLEC database 26. The LNP identifies the facilities based CLECs which are CLECs that have been assigned all the line numbers for an NPA/NXX in a specific geographic territory. This type of CLEC may be in control of the cable, dial tone and billing envelope for that number. In one exemplary embodiment, the LNP cannot be used to identify CLEC sellers, which have resold the subscriber line under their brand, but still lease the cable and tone from an incumbent local exchange carrier (ILEC). Accordingly, a third-party billing facility, e.g. a proprietor or user of the system 10, may be unable to process transaction data onto a bill page of the CLEC reseller bill page. In order to identify reseller CLECs, the system 10 may compare RAO and OCN information, returned from the LIDB host 52, to data in the ONNET database 24. The OCN is the local Telco that owns the subscriber line number and the RAO is the office of the Telco that is responsible from a billing standpoint for the subscriber line number.

If the validity check module 36 determines that the response codes are invalid, the system 10 generates modified codes 180 to 999 (see operation 98 and Table 2) which are communicated to the requestor or vendor to indicate that the mapping of the LIDB codes to the modified codes concluded that the line is an unbillable subscriber line.

If the validity check module 36 confirms the validity of the LIDB codes and, in the event of the line number being a billable line number, the processor module 54 then may check the RAO database 38 to ascertain whether or not the RAO is billable, as shown at operation 100. If the RAO is not billable, then the processor module 54 generates and communicates a return code 143 (see operation 102) to indicate to the vendor 12 that the line number belongs to a CLEC which is not billable by the system 10.

In a similar fashion, at operation 104 the processor module 54 checks to see if the OCN returned from the LIDB host 52 corresponds with a known CLEC or if the OCN corresponds with an OFFNET OCN and is therefore also unbillable by the system 10. If the line number corresponds to an OCN that is not billable, a return code 142 is generated by the processor module 54 and communicated to the vendor (see operation 106).

If the subscriber line number has passed the RAO and OCN checks and, accordingly, it appears that the number is billable, the processor module 54 may then check to see if a new NPA/NXX and OCN combination for this line number is guidable to the correct local Telco for billing (see operation 108). If the line number is not guidable, then the system 10 generates a code 141 at operation 110 which is communicated to the vendor to indicate that, even though the line number is billable, the proprietor of the system 10 is unable to guide the billing information to the new Telco for billing. Accordingly, the telephone number is in fact non-billable insofar as the system 10 is concerned and a decline status is therefore communicated to the vendor 12.

The abovementioned operations are carried out to ascertain whether or not the subscriber line can be billed for the goods and/or services requested. However, to enhance the accuracy or reliability of the system 10, further checks or verification may be conducted as described below.

In the event that the subscriber line number has passed or complied with the abovementioned checks, and has thus not yet been rejected, the system 10 may perform address verification procedures at operation 112. In particular, when the ANI is communicated to the API 14, location data is also provided which has been fed in by the user, e.g. via a computer terminal, orally over a telephone, or the like. The system 10 then interrogates an address verification database 44 to compare the address or location data (e.g. a ZIP code) supplied by the customer 11 with a reference address data as shown at operation 112. If, however, the address supplied by the customer 11 does not match with the address in the verification database 44 or, the addresses are not within a predefined range or area, the processor module 54, as shown at operation 114, generates codes 10 to 39 which are then communicated to the vendor 12 to indicate the level of likelihood that the caller (ANI) and the account owner are the same person.

During the address verification operation 112, the system 10 may interrogate a customer account record exchange (CARE) database 46 (which can be an on-site database which is regularly updated), to provide enhanced reliability. In particular, in one exemplary embodiment, the CARE database 46 or information site is one or more industry standard off-site databases which allow consumers to select or change their long distance service provider. Local Telcos forward specific customer information to the LEC associated with the subscriber. In one exemplary embodiment, the information communicated includes a new telephone number, a billing address, an installation date, a person or organization responsible for the account, or the like.

As shown at operation 116, the system 10 may interrogate the CARE database or information site and CARE data is then loaded into CLEC and new line databases to perform certain fraud and/or billing checks. The CARE information investigation may occur after a successful validation event. In one embodiment, once the system 10 has validated the subscriber line 17, the subscriber line number data is sent to a CARE database provider hosting the CARE database 46 to obtain the BNA (Billing Name and Address) and age of the account. In one exemplary embodiment, the information is returned within 48 hours and then processed. CARE records that are returned without BNA and NO ACCOUNT codes may be inserted into the CLEC database 26 for future reference. Accordingly, if the BTN is presented again at a later date, it will fail the CLEC check operation 74 (see FIG. 2).

The ANI watch database 48, which may include historical and adjusted information, may be used by the system 10 to determine if the account has previously been adjusted (see operation 116). In one exemplary embodiment, this operation includes ascertaining previous requests by the subscriber for credit, obtaining data on any written off amounts for charges that were billed to a bill page, or the like.

If adjustments have previously been made to the account associated with the subscriber line 17, the processor module 54 generates codes 1 to 5 (see operation 118) to indicate to the vendor 12 that the adjustments have previously been made. If no adjustments have been made, the processor module 54 checks to see whether or not the subscriber line number has a business line indicator as shown at operation 120. If the business line indicator is active, the system 10 generates a code 70 (see operation 122), which is communicated to the vendor 12 to advise that the line is a business line. Thereafter, as shown in operation 124, the processor module 54 may check to see if the subscriber line number has been in service for less than about 90 days and, if so, a return code 80 (see operation 126) is generated to advise the vendor 12 who may then selectively decide whether or not to conclude the transaction. A database of new numbers may be updated with the new number.

Thereafter, the system 10 may interrogate the ANI watch database 48 (see operation 128) to ascertain whether or not the area code of the line number has been changed or is scheduled to change. In one embodiment, this interrogation is for billing purposes only and is not used to decide upon the validity of the request. In this operation, the vendor 12 requesting the validation updates the billing file with the new area code number, and the processor module 54 generates a code 110 (see operation 130) to advise the vendor 12 of the scheduled change to the area code.

Once the line number has passed all the aforementioned checks, the system 10 may conclude that the subscriber line 17 is in fact a billable subscriber line based on the data obtained using ANI techniques and, accordingly, the transaction may be charged directly to the account of the subscriber. Accordingly, the system 10 then generates a code 000 (see operation 134) which is communicated to the vendor 12. The code 000 may define an approved status following both a billable line number inquiry as well as several fraud checks which are carried out by the fraud control module 132 (see FIG. 1). If the subscriber line number of the subscriber line 17 has passed the abovementioned checks and a return code 000 is generated, the procedure shown in FIG. 4 is carried out whereafter the process terminates at operation 136. Thus, operation 136 may define the end of the process during which the various checks have been conducted on the subscriber line 17 to assess whether or not it is a billable subscriber line that charges may be billed to. Operation 138 defines, in one embodiment, the last operation to which the process jumps when, at any point during the abovementioned process, the line number is found not to be billable (or a creditworthiness decision is requested) and the inquiry is accordingly terminated and the relevant code is communicated to the vendor 12.

In one exemplary embodiment, the abovementioned operations are executed in real-time. However, information sources that do not allow checks on the line number in real time may be carried out subsequently on the subscriber line number. In one embodiment, once the real-time evaluation is carried out and the return code 000 is communicated to the vendor 12, and should the vendor 12 decide to proceed with the transaction, transaction data is then returned to the system 10 by the vendor 12 for a pre-billing validation check or actual billing. During the actual billing, the system 10 may access an account folder of the subscriber line at the Telco and insert the charges due to the vendor 12 for its goods or services. As shown at operation 140, subscriber line numbers may be sent to the CARE database 46 to determine if the BNA is available at the local Telco. If the folder is not available, the local Telco sends the BNA and codes as to why the number is unavailable. If the BNA is found in the CARE database 46, the processor module 54 may then check to see whether or not the account was created within the last 90 days as shown at operation 142. If the account was not created within the last 90 days, then the business indicator is checked as shown at operation 144 and the process ends as previously shown at operation 146. If, however, the number was found in the CARE database 46, the account was created within the last 90 days, or has an active business indicator, then the system 10 may generate the appropriate codes, which are communicated to vendor 12, and the process terminates as shown at operation 148.

The above process has been described in terms of modified codes set out in Table 2 but, it is to be appreciated, that any other defined set of corresponding codes may be provided so long as the codes are mapped onto, or generated in response to, any one or more of the industry standard LIDB codes.

A summary of the codes generated by one exemplary embodiment of the system 10 during execution of the validation process is provided in Table 1 below.

TABLE 1

Modified codes generated during the BTN Validation Process.

| Code Generated and ref to flow charts | Description of code |
|---|---|
| Return Code 121 | Indicates inability to proceed with validation; returned to requestor |
| See operation 64 | Checks if ANI captured and BTN provided match (not required in all scenarios) |
| Return Code 120 | Indicates caller and # (line number) owner are not the same person; returned to requestor |
| See operation 68 | A defined Threshold limits the number of attempts on that # within a certain timeframe |
| Return Code 60 | Indicates # may not be granted service; returned to requestor. |
| See operation 71 | Checks the NPA/NXX and OCN to those in the OFFNET. OFFNET = NPA/NXX and OCN combinations where proprietor of the system 10 does not have a Billing and Collections agreement to bill into the Telco's' bill page. |
| Return Code 130-133 | Indicates that NPA/NXX & OCN for that Number are not billable; returned to requestor |
| See operation 74 | Checks the line number to see if found in known CLEC table. These are numbers that are known to have ported to a CLEC. Proprietor is unable to route these # to the correct billing entities. |
| Return code 140 | Indicates # not billable for CLEC; returned to requestor. |
| See operation 78 | Checks line # to see if owner has requested a 4250 Billing block. This block prevents monthly recurring (4250) charges from being billed to that line #. |
| Return Code 150 | Indicates that billing to a particular subscriber line has been blocked; returned to requestor. |
| See operation 82 | Checks line number for inclusion in the Block and Cancel database. This database includes requests from line # owners, agencies, businesses etc that have requested that service be cancelled and or blocked from further billing. |
| Return Code 160-161 | Indicates number found in Block and Cancel and is not billable; returned to requestor. |
| See operation 86 | Checks line # for unbillable history. Unbillables are #s where tried to bill charges previously and have been returned as unbillable. |
| Return Code 170 | Indicates # has unbilled before and is still considered unbillable; returned to requestor. |
| See operation 90 | If # not found in Unbillable, then routed to LIDB for info. |

| ITEM | Description |
|---|---|
| See operation 94 | Identifies info returned from LIDB re. that line #; Response Code = status about that # as a call termination point. OCN = Operating Company # = the local Telco that owns that #. RAO = Regional Accounting Office = the office of the Telco that is responsible from a $ flow standpoint for that #. |
| See operation 96 | Checks the validity of the LIDB code returned for the number as a Billable #. This is where the mapping of the LIDB codes to the proprietor validation codes happens. |
| Return Code 180-999 | Indicates the mappings of the LIDB codes to the proprietor Val reply codes. Each of these indicate a non-billable #; returned to requestor. |
| See operation 100 | Checks if RAO returned is an RAO that is not billable. |
| Return Code 143 | Indicates that the # belongs to a CLEC and is unbillable; returned to requestor. |
| See operation 104 | Checks if OCN returned from LIDB is a known CLEC or OFFNET OCN and therefore unbillable. |
| Return code 142 | Indicates that the new OCN is not billable; returned to requestor. |
| See operation 108 | Checks to see if new NPA/NXX & OCN combination for # is guidable to the correct local Telco for billing. |
| Return code 141 | Indicates that even though the # is billable, the system is unable to guide to the new Telco for billing; unguidable = unbillable; # returned to requestor. |

The operations to indicate if # is billable have been completed.
The next operations provide additional information about the # for the requestor e.g. to decide if and how much credit to extend for services. They also provide additional billing information.

| ITEM | Description |
|---|---|
| See operation 112 | Provides address verification (if required). Matches # to address to determine likelihood of person dialing to the person that owns the account at local Telco. |
| Return Code 10-39 | Indicates the level likelihood that the caller (ANI) and acct owner are the same. Returned to requestor. |
| See operation 116 | Checks to see if # has had adjustment activity previously. This includes request for credit, written off for charges that billed to a bill page. Requestor makes credit decision based on #s history of credits, adjustments, write offs. |

TABLE 1-continued

| | |
|---|---|
| Return Code 1-5 | Indicates the type and source of adjustment to charges to that #. Returned to requestor. |
| See operation 120 | Checks to see if the # has a business line indicator. Requestor decides if would like to extend service or not. |
| Return Code 70 | Indicates that the # is identified as a business. |
| See operation 124 | Checks to see if the # has been in service less than 90 days. Requestor makes a decision about how much service to offer # without much payment history. |
| Return Code 80 | Indicates that the # has been in service less than 90 days. |
| See operation 128 | Checks if the Area Code of the # has been scheduled to change. This is for billing information purposes only. Requestor updates billing filed with new number. |
| Return Code 110 | Indicates Area Code has been scheduled to change. New number is appended to end of record. |
| See operation 134 | If the number passes all the previous checks, then 000 code is returned to requestor. The Validation is complete for this request. |
| See operation 138 | End of validation for numbers that did not pass or were found in other checks. |

END OF REAL TIME VALIDATION EVENT
Information sources that do not allow checks on the # in Real-time (r-t), happen on # that was returned as 000 after the r-t validation event has completed. The #s are loaded into the appropriate databases. This information will be provided once the # is returned for billing.

| ITEM | Description |
|---|---|
| Operations 140, 142, 144 | Indicates path for those #s returned with a 000 code. |
| See operation 140 | #s are sent to CARE source to determine if BNA (billing Name and Address) available at local Telco. Telco sends BNA and codes as to why unavailable. |
| CLEC | #s that are returned with codes that indicate the # has moved to a CLEC from the local Telco are loaded into the CLEC table. |
| See operation 142 | #s are sent to the CARE source to determine if the account has been crested within the last 90 days. The response codes indicate this condition. |
| New within 90 | #s that are returned with codes that indicate this condition are loaded into the NEW table. |
| See operation 144 | #s are sent to a Business source. This source identifies which numbers belong to businesses. |
| Biz table | Numbers that are indicated as being line #s that belong to businesses are loaded in this table. |

Table 2 (see below) provides the various actions, which are executed in response to a modified validity code. The table provides an exemplary description and explanation of each code. Return codes 001 to 179 relate to failure codes, which are generated by the system 10 prior to investigation of the LIDB host 52. Return codes 180 to 451 are generated during the LIDB code checks. In the event of the subscriber line 17 failing the checks carried out on it, the system 10 provides optional use of a credit card and, accordingly, Table 2 sets out codes which the system 10 generates in response to executing a standard credit card enquiry for a particular transaction. If the system 10, which may be defined by a server and associated databases, is down, codes 994 to 999 are generated and communicated to the vendor.

TABLE 2

Validation & BNA Reply Codes

| Code | Action | DESCRIPTION | EXPLANATION |
|---|---|---|---|
| | | BILLABLE CODES | |
| 000 | Approved | Billable; was not found during fraud control checks | Passed all billing and fraud control checks |
| | | FRAUD CONTROL CODES (performed after billable check) | |
| | | ANI WATCH (adjustments to bill) | |
| 001 | Verify | Billable; found in ANI WATCH - CLIENT source all | Passed all billable checks; but ANI had been adjusted previously at vendor's, Client's or Telco's request for your Client # |
| 002 | Verify | Billable; ANI WATCH - CLIENT source Client | Passed all billable checks; but ANI had been adjusted previously at Client's request for your Client # |
| 003 | Verify | Billable; ANI WATCH - CLIENT source Telco or Vendor | Passed all billable checks; but ANI had been adjusted previously at vendor's or Telco's request for your Client # |

TABLE 2-continued

Validation & BNA Reply Codes

| Code | Action | DESCRIPTION | EXPLANATION |
|---|---|---|---|
| 004 | Verify | Billable; found in ANI WATCH - GLOBAL | Passed all billable checks; ANI had been adjusted previously at vendor's, Client's or Telco's request for all Client ids |
| 005 | Verify | Billable; found in ANI WATCH - PRODUCT | Passed all billable checks; ANI had been adjusted previously at vendor's, Client's or Telco's request for same product type |
| ZIP VERIFICATION | | | |
| 010 | Verify | Billable; Unable to match ZIP invalid | Passed all billable checks; unable to find this Zip code for this NPA/NXX - |
| 011 | Verify | Billable; ZIP does not match | Passed all billable checks; Zip code does not match this NPA/NXX |
| 012 | Verify | Billable; ZIP matches to same Metropolitan area | Passed all billable checks; Zip code matches to same Metropolitan area as NPA NXX. |
| ADDRESS VERIFICATION | | | |
| 020 | Verify | Billable; BNA match not found | Passed all billable checks; no BNA match found for ANI |
| 021 | Verify | Billable; Unable to verify BNA invalid | Passed all billable checks; unable to verify BNA to ANI info sent |
| 022 | Verify | Billable; with zip-Match, plus4-Match, locale-Match | Passed all billable checks; BNA Zip code + 4 & locale (street address) matches info sent for ANI, Name does not match |
| 023 | Verify | Billable; with zip-Match, plus4-Match, NoMatch-locale | Passed all billable checks; BNA Zip code + 4 matches info sent for ANI but locale (street address) does not match |
| 024 | Verify | Billable; zip-Match, NoMatch-plus4, locale-Match | Passed all billable checks; BNA Zip code & locale (street address) matches info sent for ANI but + 4 does not match |
| 025 | Verify | Billable; zip-Match, NoMatch-plus4, NoMatch-locale | Passed all billable checks; BNA Zip code matches info sent for ANI but locale (street address) & + 4 does not match |
| 026 | Verify | Billable; NoMatch-zip, plus4-Match, locale-Match | Passed all billable checks; BNA + 4 and local (street address) matches info sent for ANI Zip does not match |
| 027 | Verify | Billable; NoMatch-zip, plus4-Match, NoMatch-locale | Passed all billable checks; BNA + 4 and locale (street address) matches info sent for ANI but Zip does not match |
| 028 | Verify | Billable; NoMatch-zip, NoMatch-plus4, locale-Match | Passed all billable checks; BNA locale (street address) matches info sent for ANI but ZIP and + 4 does not match |
| 029 | Verify | Billable; NoMatch-zip, NoMatch-plus4, NoMatch-locale | Passed all billable checks; BNA does not match zip, + 4 or locale (street address) sent for ANI |
| 030 | Good | Address & Zip Match | |
| 031 | Verify | Address Match, Zip No Match | |
| 032 | Verify | Address Match, Zip Service Unavailable | |
| 033 | Verify | Address No Match, Zip Match | |
| 034 | Verify | Address No Match, Zip No Match | |
| 035 | Verify | Address No Match, Zip Service Unavailable | |
| 036 | Verify | Address Service Unavailable, Zip Match | |
| 037 | Verify | Address Service Unavailable, Zip No Match | |
| 038 | Verify | Address Service Unavailable, Zip Service Unavailable | |

TABLE 2-continued

Validation & BNA Reply Codes

| Code | Action | DESCRIPTION | EXPLANATION |
|---|---|---|---|
| | | AREA CODE CHANGE INDICATOR | |
| 110 | Update | Indicates there has been an area code change for this NPA/NXX | Code is sent in addition to the validation response codes. New phone number is appended to record. Provided to update the account with the correct BTN. |
| | | MISCELLANEOUS | |
| 120 | Verify | BTN and ANI do not match | For use where BTN and ANI are passed and do not match. |
| 121 | Verify | BTN or ANI are missing from record | For use where BTN and ANI is missing from record |
| | | UNBILLABLE CODES OFFNET | |
| 130 | Unbillable | NPA/NXX found in OFFNET - GLOBAL | Area code/exchange (NPA/NXX) combination resides in OFFNET DB. OFFNET is a territory where the LEC (Local Exchange Carrier) is unable to provide 3rd party presentation in to its envelope. |
| 131 | Unbillable | NPA/NXX found in OFFNET - CLIENT SPECIFIC | Area code/exchange (NPA/NXX) combination resides in OFFNET DB specific for this Client id. |
| 132 | Unbillable | NPA/NXX found in OFFNET - PRODUCT | Area code/exchange (NPA/NXX) combination resides in OFFNET DB specific for this product type. |
| 133 | Unbillable | NPA/NXX NOT VALID | Area code/exchange is not a valid area code exchange |
| | | CLEC (CLECs are unable to provide 3rd party bill presentation in their envelopes.) | |
| 140 | Unbillable | Line number (NPA/NXX-XXX) in CLEC Territory | BTN has been ported to a CLEC (competitive local exchange carrier). |
| 141 | Unbillable | NPA/NXX not ON NET | BTN has been ported to a CLEC (competitive local exchange carrier) and is not billable. |
| 142 | Unbillable | Line number OCN in CLEC OCN table | Operating Company number for this BTN was found on CLEC OCN table. The number is not billable. |
| 143 | Unbillable | Line number RAO in CLEC RAO table | Regional Accounting Office number for this BTN was found on CLEC RAO table. This BTN is not billable. |
| | | 42 BLOCK (4250s Only) | |
| 150 | Unbillable | Line Number has a block for 4250 records | Consumer has requested a block for all MRCs (monthly recurring charges) from being billed to this phone number. |
| | | BLOCK & CANCEL | |
| 160 | Unbillable | GLOBAL - Line number has been blocked to stop all charges. | Consumer requested block to stop all charges from being billed to this number. |
| 161 | Unbillable | CLIENT - Line number has a block to stop all charges from this Client id. | Consumer requested a block to stop charges from being billed or to cancel service for this phone number from this Client id. |
| | | UNBILLS | |
| 170 | Unbillable | Line number is Unbillable. | Line number has been returned from the Local Telephone companies within the last 6 months as unable to be billed. |

TABLE 2-continued

Validation & BNA Reply Codes

| Code | Action | DESCRIPTION | EXPLANATION |
|---|---|---|---|
| | | LIDB FAILURE | |
| 180 | Unbillable | Line number failed LIDB check - GENERAL | Line Number has been returned from LIDB as unbillable. |
| 181 | Unbillable | Vacant NPA NXX | No working line #s in NPA NXX |
| 182 | Unbillable | No Incoming Calls | Line # cannot accept incoming calls |
| 183 | Unbillable | Denied ANI | Auto decline of all attempts from this ANI |
| 184 | Unbillable | Calling Card block | Auto decline of Calling Card number |
| 185 | Unbillable | Collect Call Block | Auto decline of Collect calls to this number |
| 186 | Unbillable | Third Party Call Block | Auto decline all Third Party billed calls to this number |
| 187 | Unbillable | Credit Card Block | Auto decline of charges billed to Credit Card |
| 188 | Unbillable | Group Number Block | Auto decline of attempts from this group. |
| 189 | Unbillable | Audiotext Bock | Number does not allow audiotext calls. |
| 190 | Unbillable | Excessive Calling Card PIN hits | Threshold for calling card attempts has been exceeded. |
| 191 | Unbillable | Line Number Block | Auto decline of all charges to this number |
| 200 | Unbillable | Excessive Use - BTN | BTN has exceeded threshold |
| 201 | Unbillable | Excessive Use DN | DN has exceeded threshold |
| 202 | Unbillable | Excessive Use - ANI | ANI has exceeded threshold |
| 203 | Unbillable | Excessive USE - Calling Card Pin | Calling Card Pin has exceeded threshold |
| 220 | Unbillable | Feature Group A | Local telephone switch is Feature Group A |
| 221 | Unbillable | PBX line | Line # is a PBX line |
| 222 | Unbillable | WATS line | Line # is a WATS line |
| 223 | Unbillable | Hotel/Motel Auto Quote w/ tax | Hotel/Motel Auto Quote w/tax |
| 224 | Unbillable | Hotel/Motel Auto quote w/o tax | Hotel/Motel Auto quote w/o tax |
| 225 | Unbillable | Dormitory line | Line # belongs to a dorm |
| 226 | Unbillable | Hospital line | Line number belongs to a hospital |
| 227 | Unbillable | Centrex line | Line number belongs to CENTREX |
| 228 | Unbillable | Alternate Service Provider | Line # belongs to an alternate service provider |
| 229 | Unbillable | POTS line (collect or third party calls) | Line # is plain old telephone service lines for business or residential |
| 230 | Unbillable | Pager # | Line number belongs to pager |
| 231 | Unbillable | PCS/Mobile/Cellular # | Line number belongs to a wireless provider |
| 240 | Unbillable | Line was disconnected w/o referral | Line # was disconnected w/o a referral number |
| 241 | Unbillable | Line Number changing | Line is not connected yet. |
| 242 | Unbillable | not used | |
| 243 | Unbillable | DISCO w/o referral | Line number has been removed from service w/o referral |
| 244 | Unbillable | Temp DISCO | Line number has been removed from service temporarily |
| 245 | Unbillable | DISCO with referral | Line number has been disconnected w/referral or Operator takes calls |
| 246 | Unbillable | Temp DISCO w/referral | Line number has been removed from service temporarily w/referral |
| 250 | Unbillable | POTS line rating on rate plan | POTS line is on a rate plan for business or residential message rate 1 or 2 or flat rate |
| 300 | Unbillable | Public - Incompatible interface | Public phone with incompatible interface |
| 301 | Unbillable | LEC Public Standard PreP OT | LEC Public phone standard interface; prepay overtime |
| 302 | Unbillable | LEC Public Alternate | LEC Public phone alternate interface; functions controlled by set |
| 303 | Unbillable | LEC Public Standard PP OT | LEC Public phone standard interface; postpay overtime |
| 304 | Unbillable | IC Public | IC Public Phone - Alternate Interface |
| 305 | Unbillable | IC Public Standard | IC Public Phone - Standard Interface |
| 306 | Unbillable | LEC Public Special - PP OT | LEC Public Phone - Special billing post paid OT |
| 307 | Unbillable | LEC Public Special - PreP OT | LEC Public Phone - Special Billing; Pre pay OT |
| 308 | Unbillable | LEC Semi Public | LEC Semi Public Phone |

TABLE 2-continued

Validation & BNA Reply Codes

| Code | Action | DESCRIPTION | EXPLANATION |
|---|---|---|---|
| 309 | Unbillable | LEC Semi Public Phone (no collect or 3rd Party calls) | LEC Semi Public Phone does not allow collect or 3rd party calls to this number |
| 310 | Unbillable | LEC Prepaid Card | LEC Prepaid Card Telecommunications station |
| 311 | Unbillable | IPP (fka COCOT) Standard interface | Payphone Standard |
| 312 | Unbillable | IPP (fka COCOT) Alternate interface | Payphone - Alternate |
| 313 | Unbillable | Coinless (non IPP fka COCOT) | Coinless Pay phone |
| 314 | Unbillable | Coinless (IPP fka COCOT) | Coinless payphone |
| 315 | Unbillable | Prison (non IPP fka COCOT) | Prison payphone |
| 316 | Unbillable | Prison (IPP fka COCOT) | Prison Payphone |
| 450 | Unbillable | BNS: Voice Quote - without tax | Charge quotes without tax |
| 451 | Unbillable | BNS: Voice Quote - with tax | Charge quotes with tax |
| CREDIT CARD RESPONSE CODES | | | |
| 000 | Approved | Credit card approved | |
| 501 | Decline/Error | User authentication Failed | |
| 502 | Decline/Error | Invalid tender | Your merchant bank account does not support the following credit card type that was submitted |
| 503 | Decline/Error | Invalid transaction type | Transaction type is not appropriate for this transaction. For example, you cannot credit an authorization-only transaction. |
| 504 | Decline/Error | Invalid amount | |
| 505 | Decline/Error | Invalid merchant information | Processor does not recognize your merchant account information. Contact your bank account acquirer to resolve this problem. |
| 512 | Decline/Error | Declined | Please check the credit card number and transaction information to make sure they were entered correctly. If this does not resolve the problem, have the customer call the credit card issuer to resolve. |
| 513 | Decline/Error | Referral | Transaction was declined but could be approved with a verbal authorization from the bank that issued the card. Submit a manual Voice Authorization transaction and enter the verbal auth code |
| 519 | Decline/Error | Original transaction ID not found | The transaction ID you entered for this transaction is not valid. |
| 520 | Decline/Error | Cannot find the customer reference number | |
| 522 | Decline/Error | Invalid ABA number | |
| 523 | Decline/Error | Invalid account number | Please check credit card number and resubmit. |
| 530 | Decline/Error | Account Lookup information Mismatch | Account provided found in system, however, unique key provided does not match unique key in system. |
| 531 | Decline/Error | Account does not exist | Account provided not found in system |
| 542 | Decline/Error | Invalid expiration date | Please check and re-submit |
| 525 | Decline/Error | Transaction type not mapped to this host | |
| 526 | Decline/Error | Invalid vendor account | |
| 527 | Decline/Error | Insufficient partner permissions | |
| 528 | Decline/Error | Insufficient user permissions | |
| 550 | Decline/Error | Insufficient funds available | |
| 551 | Decline/Error | Invalid transaction returned from host | |

TABLE 2-continued

Validation & BNA Reply Codes

| Code | Action | DESCRIPTION | EXPLANATION |
|---|---|---|---|
| 552 | Decline/Error | Processor not available | |
| 553 | Decline/Error | Credit error | Please make sure you have not already credited this transaction, or that this transaction ID is for a creditable transaction. (For example, you cannot credit an authorization.) |
| 554 | Decline/Error | Void error | Please make sure the transaction ID entered has not already been voided. If not, then look at the Transaction Detail screen for this transaction to see if it has settled. (The Batch field will be set to a number greater than zero if the transaction has been settled). If the transaction has already settled, your only recourse is a reversal (credit a payment or submit a payment for a credit). |
| 555 | Decline/Error | Capture error | Only authorization transactions can be captured |
| 556 | Decline/Error | Failed AVS check | Address and Zip code do not match |
| 557 | Decline/Error | Cannot exceed sales cap | For ACH transactions only |
| 558 | Decline/Error | CVV2 Mismatch | |
| 800 | Unbillable | LNP Only Look-Up, number was found | LNP Only Look-Up, number was found in the LNP GTT database as ported. |
| 801 | Unbillable | LNP Only Look-Up, number was not found | LNP Only Look-Up, number was not found in the T.NP GTT database, not ported. |
| 802 | Unbillable | LNP Only Look-Up, the NPA/NXX is not a portable range | LNP Only Look-Up, the NPNXX is not a portable range. |
| | | SYSTEM DOWN | |
| 994 | Resubmit | Message Format Error | Message received in invalid or unrecognized format. |
| 995 | Resubmit | Time out | Session timed out. |
| 996 | Resubmit | Connection Failure | Unable to connect. |
| 997 | Resubmit | Subsystem Failure | Subsystem, such as LIDB, Credit Card, etc, not available. |
| 998 | Resubmit | Network Failure | Network Not Available |
| 999 | Resubmit | System Down | System Unavailable |

Note:
The result of an AVS check does not mean that the transaction is declined. This information may be advice only. The system may compare the AVS data with billing information for the buyer and pass the results of the comparison to the merchant.

As mentioned above, the system 10 may translate the LIDB codes into modified verification codes as shown in Table 2. These modified validity codes are then mapped or translated. Table 3 below provides a list of the modified validity codes which are generated following the mapping carried out by the processor module 54 to translate LIDB codes to the modified verification codes set out in Table 1.

TABLE 3

LIDB/LNP SOURCE TRANSLATIONS FOR ISP:

| Resp. Type In | Resp. Code In | ACTION | LIDB ADMIN? | Description | rtfc type | Code Out |
|---|---|---|---|---|---|---|
| APP | 000 | Approved | | Calling card has an Unrestricted PIN. | G1 | 000 |
| APP | 001 | Approved | | Calling card has a Restricted PIN. The switch must verify that the DNI matches the first 10 digits of the calling card before placing the call. | g1 | 000 |

TABLE 3-continued

LIDB/LNP SOURCE TRANSLATIONS FOR ISP:

| Resp. Type In | Resp. Code In | ACTION | LIDB ADMIN? | Description | rtfc type | Code Out |
|---|---|---|---|---|---|---|
| APP | 004 | Approved | | Collect call - No verification is required. | G1 | 000 |
| APP | 005 | Approved | | Third-party call - No verification is required. | G1 | 000 |
| APP | 006 | Approved | | There is a system error. | S | 999 |
| APP | 008 | Approved | | Communications Link Tests "Good." | S | 999 |
| APP | 010 | Approved | | Commercial credit card is approved and the zip code matches, if the zip code was sent. | G1 | 000 |
| APP | 011 | Approved | Y | Bill-to number has an Admin. Override to automatically approve the transaction. (Admin. Reply) | G1 | 000 |
| APP | 012 | Approved | | Originating number (ANI) has an Admin. Override to automatically approve the transaction. (Admin. Reply) | G1 | 000 |
| APP | 013 | Approved | | Dialed number (DNI) has an Admin Override to automatically approve the transaction. (Admin. Reply) | G1 | 000 |
| APP | 014 | Approved | | Group number has an Admin. Override to automatically approve the transaction. (Admin. Reply) | G1 | 000 |
| APP | 015 | Approved | | Commercial credit card is approved but the zip code check is unavailable. | CC | 500 |
| APP | 016 | Approved | | Commercial credit card is approved but the zip code check is unavailable. Retry later. | CC | 501 |
| APP | 017 | Approved | | Commercial credit card is approved but the zip code check is not supported. | CC | 502 |
| APP | 018 | Approved | | Commercial credit card is approved and the address matches but the zip code does not match. | CC | 503 |
| APP | 019 | Approved | | Commercial credit card is approved and the address and the zip code match. | CC | 504 |
| APP | 020 | Success | | LNP Only Look-Up, number was found in the LNP GTT database as ported. | LNP | 800 |
| APP | 021 | Success | | LNP Only Look-Up, number was not found in the LNP GTT database, not ported. | LNP | 801 |
| CON | 050 | Verify | | Collect call number has no block. Verify acceptance of the charge. | o1 | 000 |
| CON | 051 | Verify | | Third-party call number has no block. Verify acceptance of the charge. | 01 | 000 |
| CON | 053 | Denied | | Unable to authorize, Automatic Code Gapping is in effect at the LIDB. Every third query is dropped by the LIDB. | S | 999 |
| CON | 054 | Denied | Y | Excessive Use - The bill-to number exceeded the high limit threshold in the Admin. fraud control system. (Admin. Reply) | G3 | 000 |
| CON | 055 | Denied | Y | Excessive Bad PIN Attempts - The threshold for bad PIN attempts for the calling card was exceeded in the Admin. fraud control system. (Admin. Reply) This is the same as reply code 309. | 02 | 000 |
| CON | 060 | Conditional | Y | Low Limit Warning - The bill-to number exceeded the low limit threshold in the Admin. fraud control system. (Admin. Reply) | G3 | 000 |
| CON | 061 | Conditional | Y | Low Limit Warning - The dialed number exceeded the low limit threshold in the Admin. fraud control system. (Admin. Reply) | G3 | 000 |
| CON | 062 | Denied | Y | Excessive Use Dialed - The dialed number exceeded the high limit threshold in the Admin. fraud control system. (Admin Reply) | G3 | 000 |
| CON | 063 | Conditional | Y | No Host Still Billable - There is no LIDB check available, but the Customer has a billing agreement with this LEC. (Admin. Reply) | G2 | 180 |
| CON | 064 | Approved | Y | Commercial credit card is approved but the zip code and the address do not match. | CC | 505 |
| CON | 065 | Conditional | Y | Low Limit Warning - The ANI exceeded the low limit threshold in the Admin. fraud control system. (Admin. Reply) | G3 | 000 |
| CON | 066 | Denied | Y | Excessive Use ANI - The ANI exceeded the high threshold in the Admin. fraud control system. (Admin. Reply) | G3 | 000 |

TABLE 3-continued

LIDB/LNP SOURCE TRANSLATIONS FOR ISP:

| Resp. Type In | Resp. Code In | ACTION | LIDB ADMIN? | Description | rtfc type | Code Out |
|---|---|---|---|---|---|---|
| CON | 070 | Approved | | Calling card has no service denial in the Card Service Denial Indicator field. Calling card calls may be billed to this card number. | G1 | 000 |
| CON | 071 | Approved | | Calling card has no service denial in the Pin Service Denial Indicator field. Calling card calls may be billed to this card number. | G1 | 000 |
| CON | 080 | Verify | | Collect calls - Accept intralata, Reject interlata collect calls. Recommend verify acceptance of the charge. | 01 | 000 |
| CON | 081 | Verify | | Third-party calls - Accept intralata, reject interlata third-party calls. Recommend verify acceptance of the charge. | 01 | 000 |
| CON | 082 | Verify | | Collect calls - Accept intralata, verify interlata collect calls. Recommend verify acceptance of the charge. | 01 | 000 |
| CON | 083 | Verify | | Third-party calls - Verify intralata, reject interlata third-party calls. Recommend Verify acceptance of the charge. | 01 | 000 |
| CON | 084 | Verify | | Collect call - Verify acceptance of the charge by an Operator. | 01 | 000 |
| CON | 085 | Verify | | Third-party call - Verify acceptance of the charge by an Operator. | 01 | 000 |
| CON | 086 | Verify | | Collect call - Accept intralata charge, verify interlata charge with Operator. | 01 | 000 |
| CON | 087 | Verify | | Third-party calls - Verify intralata charge with operator, reject interlata charge with Operator. | 01 | 000 |
| CON | 088 | Verify | | Collect Calls: POTS Line (Business/Residential) | G5 | 000 |
| CON | 089 | Verify | | Third-Party Calls: POTS Line (Business/Residential) | G5 | 000 |
| CON | 090 | Verify | | BNS: Centrex Line, Collect calls - Some LECs allow billing to this type of line, others do not. Verify Acceptance. | G4 | 000 |
| CON | 091 | Verify | | BNS: POTS Line - Residential - Message rate 1 | G9 | 000 |
| CON | 092 | Verify | | BNS: POTS Line - Residential - Message rate 2 | G9 | 000 |
| CON | 093 | Verify | | BNS: POTS Line - Business - flat rate | G9 | 000 |
| CON | 094 | Verify | | BNS: POTs Line - Business - message rate 1 | G9 | 000 |
| CON | 095 | Verify | | BNS: POTS Line - Business - message rate 2 | G9 | 000 |
| CON | 096 | Verify | | BNS: POTS Line - Residential - flat rate | G9 | 000 |
| DENY | 100 | Denied | | Message Format Error Message | S | 994 |
| DENY | 100 | Denied | | Message Format Error - Date format | S | 994 |
| DENY | 100 | Denied | | Message Format Error - Header Message Error | S | 994 |
| DENY | 100 | Denied | | Message Format Error - Merchant ID Error | S | 994 |
| DENY | 100 | Denied | | Message Format Error - No End of Header Indicator | S | 994 |
| DENY | 100 | Denied | | Message Format Error - Header Data Indicator, did not contain data in each field of the message That was represented by the message text map field | S | 994 |
| DENY | 100 | Denied | | Message Format Error - PIN not numeric | S | 994 |
| DENY | 100 | Denied | | Message Format Error - Terminating Error commercial credit card oni | S | 994 |
| DENY | 100 | Denied | | Message Format Error - Terminating Number not numeric | S | 994 |
| DENY | 100 | Denied | | Message Format Error - Originating Number not Numeric | S | 994 |
| DENY | 100 | Denied | | Message Format Error - Charge Number not Numeric | S | 994 |
| DENY | 100 | Denied | | Message Format Error - No End Header Indicator | S | 994 |
| DENY | 101 | Denied | | Message Format Error Invalid Customer/Terminal ID Number | S | 994 |
| DENY | 102 | Denied | | Message Format Error Invalid Message Type | S | 994 |
| DENY | 103 | Denied | | Message Format Error Invalid Transaction Type | S | 994 |
| DENY | 104 | Denied | | Message Format Error Invalid Sequence Number | S | 994 |
| DENY | 105 | Denied | | Message Format Error Invalid Data Indicator | S | 994 |
| DENY | 105 | Denied | | Message Format Error- Header Data Indicator | S | 994 |

TABLE 3-continued

LIDB/LNP SOURCE TRANSLATIONS FOR ISP:

| Resp. Type In | Resp. Code In | ACTION | LIDB ADMIN? | Description | rtfc type | Code Out |
|---|---|---|---|---|---|---|
| DENY | 107 | Denied | | Bad PIN format. PINs must be equal to or higher than 2000. | S | 994 |
| DENY | 200 | Denied | | Calling card blocked, missing customer record - There is no record of that calling card number in the database. | S | 994 |
| DENY | 201 | Denied | | BNS, missing customer record - There is no record of that line number in the database. | S | 994 |
| DENY | 202 | Denied | | Missing BNG - There is no record of that NPANXX in the database. | S | 994 |
| DENY | 203 | Denied | | Non-billable NXX - DPC table failure. The NPANXX does not have routing or allow billing, e.g. cellular. (LIDB or Admin. Reply) | G2 | 180 |
| DENY | 204 | Denied | | Calling card blocked, screened data - A screening mechanism is in place at the LIDB that does not allow charges to this calling card. | O2 | 000 |
| DENY | 205 | Denied | | Protocol converter problem - There is a problem with the SS7 protocol converter. | S | 999 |
| DENY | 206 | Denied | | BNS & No Calling Card Calls - No Host, Nonparticipating Group. This NPANXX exists but there is no LIDB host. (LIDB or Admin. Reply) | o2 | 180 |
| DENY | 207 | Denied | | LIDB Access Denied because no queries should be sent to this LIDB destination. Admin. Reply) | S | 999 |
| DENY | 208 | Denied | | Calling card blocked, Screened Data on PIN (Pin Service Denial Indicator) - A screening mechanism is in place at the LIDB that does not allow charges to this PIN. | O2 | 000 |
| DENY | 209 | Denied | | External SS7 Problem - There is a format problem in the SS7 network | S | 999 |
| DENY | 210 | Denied | | Calling card blocked, screened data - A screening mechanism is in place at the LIDB that does not allow charges to this calling card. | O2 | 000 |
| DENY | 211 | Denied | | Calling card is blocked because it has a bad PIN or the PIN does not match database information. | O2 | 000 |
| DENY | 211 | Denied | | Unexpected Data Value, Calling card blocked, Bad PIN - This means a bad PIN was used or there is no PIN on file. | O2 | 000 |
| DENY | 212 | Denied | | Calling card blocked, PIN Excessive Use at LIDB Owner. - The PIN exceeded the high threshold in the LIDB fraud control system | G3 | 000 |
| DENY | 213 | Denied | | Vacant BNG - There are no working lines in the NPANXX. | G2 | 181 |
| DENY | 214 | Denied | | No Collect calls - Collect calls are not allowed to this line number. | O2 | 000 |
| DENY | 215 | Denied | | No Third-party calls - Third-party calls are not allowed to this line number | O2 | 000 |
| DENY | 216 | Denied | | BNS: LEC Public - Standard Interface (functions controlled by the network) - Postpay Overtime | G10 | 303 |
| DENY | 217 | Denied | | BNS: Coinless (non IPP fka COCOT) | G10 | 313 |
| DENY | 218 | Denied | | BNS: semi-public phone - No Collect or Third-party calls are allowed to this line number. | G10 | 309 |
| DENY | 219 | Denied | | Spare - This LIDB response is not in use at this time. | AV | 180 |
| DENY | 220 | Denied | | Time-out, No response from Host - A response was not received from the host database within 4 seconds for a Telco query or 12 seconds for a Bank card query. (LIDB or Admin. Reply) | S | 180 |
| DENY | 221 | Denied | | BNS Data unavailable, Error Message, No Host - No collect or third-party calls should be allowed to this line number. | S | 180 |
| DENY | 222 | Denied | | Calling card Data unavailable, Error Message, No Host - No calling card calls should be allowed to this line number. | S | 180 |

TABLE 3-continued

LIDB/LNP SOURCE TRANSLATIONS FOR ISP:

| Resp. Type In | Resp. Code In | ACTION | LIDB ADMIN? | Description | rtfc type | Code Out |
|---|---|---|---|---|---|---|
| DENY | 223 | Denied | | BNS & Calling card, screened response LIDB - A screening mechanism is in place at the LIDB that does not allow charges to this account number. | O2 | 000 |
| DENY | 224 | Denied | | LIDB Misroute - The query was routed to the wrong LIDB. | S | 999 |
| DENY | 225 | Denied | | Reject, Reroute - The LIDB could not read the format of the query. | S | 994 |
| DENY | 226 | Denied | | Unexpected Component - The LIDB cannot interpret the format of the query. | S | 994 |
| DENY | 227 | Denied | | UDTS, SS7 Network problem - There is an SS7 network problem. | S | 999 |
| DENY | 228 | Denied | | BNS: Personal Communication Service (PCS) | G8 | 231 |
| DENY | 229 | Denied | | BNS: Mobile | G8 | 231 |
| DENY | 230 | Denied | | Not Billable - The Customer does not have a billing arrangement with the LEC for this NPANXX (OCN On-Net Screening). | G2 | 180 |
| DENY | 231 | Denied | | BNS: LEC Prepaid Telecommunications Card Station | G10 | 310 |
| DENY | 232 | Denied | | Feature Group A (FGA) | G4 | 000 |
| DENY | 233 | Denied | | BNS: LEC Public - Alternate Interface (functions controlled by set) | G10 | 302 |
| DENY | 234 | Denied | | BNS: LEC Public - Special Billing - Postpay Overtime (functions controlled by the network) | G10 | 306 |
| DENY | 235 | Denied | | BNS: LEC Public - Special Billing - Prepay Overtime (functions controlled by the network) | G10 | 307 |
| DENY | 236 | Denied | | BNS: Public - Incompatible Network Interface (interface other than standard or alternate) | G10 | 300 |
| DENY | 237 | Denied | | BNS: IC Public - Alternate Interface | G10 | 304 |
| DENY | 238 | Denied | | BNS: IPP (fka COCOT) - Standard Interface | | 311 |
| DENY | 239 | Denied | | BNS: Pager | G8 | 230 |
| DENY | 241 | Denied | | General, Reject - The LIDB could not read the format of the query. | S | 994 |
| DENY | 242 | Denied | | Invoke, Reject - The LIDB could not read the format of the query. | S | 994 |
| DENY | 243 | Denied | | Return Result, Reject - The LIDB could not read the format of the query. | S | 994 |
| DENY | 244 | Denied | | Return Error, Reject - The LIDB could not read the format of the query. | S | 994 |
| DENY | 245 | Denied | | Transaction Portion, Reject - The LIDB could not read the format of the query. | S | 994 |
| DENY | 246 | Denied | | BNS: Vacant Number - There is no line number assigned. | G2 | 180 |
| DENY | 247 | Denied | | BNS: Disconnected without referral - The line number was disconnected with no referral to a new line number. | G6 | 240 |
| DENY | 248 | Denied | | BNS: Changed to non-published number - The line number was changed to a non-published number. | o5 | 000 |
| DENY | 250 | Denied | | No Collect Calls, Screened Data - A screening mechanism is in place at the LIDB that does not allow charges to this line number. | 02 | 000 |
| DENY | 251 | Denied | | No Third-party calls, Screened Data - A screening mechanism is in place at the LIDB that does not allow charges to this line number. | 02 | 000 |
| DENY | 252 | Denied | | BNS: Screened Data - A screening mechanism is in place at the LIDB that does not allow charges to this line number. | G7 | 191 |
| DENY | 253 | Denied | | BNS: Screened Data - A screening mechanism is in place at the LIDB that does not allow charges to this line number. | G7 | 191 |
| DENY | 254 | Denied | | BNS & No Calling Card, Unavailable network resource - This line or card number is not in the database. | 02 | 411 |
| DENY | 255 | Denied | | BNS: Screened Data - A screening mechanism is in place at the LIDB that does not allow charges to this line number. | G7 | 191 |

TABLE 3-continued

LIDB/LNP SOURCE TRANSLATIONS FOR ISP:

| Resp. Type In | Resp. Code In | ACTION | LIDB ADMIN? | Description | rtfc type | Code Out |
|---|---|---|---|---|---|---|
| DENY | 256 | Denied | | BNS: Being changed - The line number is being changed; it may not yet be connected. | G6 | 241 |
| DENY | 257 | Denied | | BNS: May not yet be connected - The line number may be new; it may not yet be connected. | G6 | 243 |
| DENY | 258 | Denied | | BNS: Temporarily disconnected - The line number is temporarily disconnected. | G6 | 244 |
| DENY | 259 | Denied | | BNS: Disconnected, calls being taken by operator - The line number is temporarily disconnected, the operator is taking calls. | G6 | 245 |
| DENY | 260 | Denied | | BNS: Temporarily removed from service - The line number is temporally removed from service. | G6 | 244 |
| DENY | 261 | Denied | | BNS: Not in service for incoming calls - This line number cannot accept incoming calls. | G2 | 182 |
| DENY | 262 | Denied | | BNS: Temporarily disconnected at customer request without referral - The line number is temporarily disconnected at the request of the customer without referral. | G6 | 245 |
| DENY | 263 | Denied | | BNS: Temporarily disconnected at customer request with referral - The line number is temporarily disconnected at the request of the customer with referral. | G6 | 246 |
| DENY | 264 | Denied | | BNS: Changed with referral to new number - The line number was changed. A referral to another line number is in place. | o5 | 000 |
| DENY | 265 | Denied | | Calling card blocked, PIN Nonpayment - The calling card is blocked because of nonpayment. | 02 | 000 |
| DENY | 266 | Denied | | Calling card blocked, Service Restriction on PIN - There is a service restriction on this PIN. | 02 | 000 |
| DENY | 267 | Denied | | Calling card blocked, no PINs assigned. There is no PIN assigned to this calling card/line number. | 02 | 000 |
| DENY | 268 | Denied | | Calling card blocked, service denial - There is a service restriction on this calling card. | 02 | 000 |
| DENY | 269 | Denied | | Calling Card - The calling card is a CIID (proprietary card) for which there is no host. | 02 | 000 |
| DENY | 270 | Denied | | BNS: Unexpected Data Value - No Collect or Third-Party Calls are allowed. | S | 994 |
| DENY | 272 | Denied | | LIDB/CCC Response Time-out - A response was not received from the host database within 4 seconds for a Telco query and 12 seconds for a Bank query. | S | 180 |
| DENY | 273 | Denied | | No Collect Calls at Customer Request - The end user customer requested the block for collect calls to this line number. | 02 | 000 |
| DENY | 274 | Denied | | BNS & No Calling Card Calls: Screened data. | 02 | 000 |
| DENY | 275 | Denied | | BNS: Hotel/Motel Auto Quote - with tax | G4 | 000 |
| DENY | 276 | Denied | | BNS: Dormitory Line | G4 | 225 |
| DENY | 277 | Denied | | BNS: Hotel/Motel Auto Quote - without tax | G4 | 000 |
| DENY | 278 | Denied | | BNS: PBX Line | G4 | 221 |
| DENY | 279 | Denied | | BNS: Prison (IPP fka COCOT) | G10 | 316 |
| DENY | 280 | Denied | | BNS: WATS Line | G4 | 222 |
| DENY | 281 | Denied | | No Third-party calls at Customer Request - The end user customer requested the block for third-party calls to this line number. | 02 | 000 |
| DENY | 282 | Denied | | BNS: LEC Public - Standard interface - Prepay Overtime | G10 | 301 |
| DENY | 283 | Denied | | BNS: Coinless (IPP fka COCOT) | G10 | 314 |
| DENY | 284 | Denied | | BNS: IC Public - Standard Interface | G10 | 305 |
| DENY | 285 | Denied | | BNS: Voice Quote - without tax | o6 | 450 |
| DENY | 286 | Denied | | BNS: Voice Quote - with tax | o6 | 451 |
| DENY | 287 | Denied | | BNS: IPP (fka COCOT) - Alternate Interface | G10 | 312 |
| DENY | 288 | Denied | | BNS: Hospital | G4 | 226 |
| DENY | 289 | Denied | | BNS: Prison (non-IPP fka COCOT) | G10 | 315 |
| DENY | 290 | Denied | | BNS: LEC Semi-Public | G10 | 308 |
| DENY | 291 | Denied | | BNS: Subsystem Congestion | S | 180 |
| DENY | 292 | Denied | | BNS: Subsystem Failure | S | 180 |
| DENY | 293 | Denied | | BNS: No translation for address of such nature | S | 180 |

TABLE 3-continued

LIDB/LNP SOURCE TRANSLATIONS FOR ISP:

| Resp. Type In | Resp. Code In | ACTION | LIDB ADMIN? | Description | rtfc type | Code Out |
|---|---|---|---|---|---|---|
| DENY | 294 | Denied | | BNS: Unequipped User | S | 999 |
| DENY | 295 | Denied | | BNS: Network Failure | S | 180 |
| DENY | 296 | Denied | | BNS: Network congestion | S | 999 |
| DENY | 297 | Denied | | BNS: Cellular (cellular is distinct from mobile) | G8 | 231 |
| DENY | 298 | Denied | | BNS and Calling Card - Although the NPANXX belongs to SWBT the end-user account number is no longer is a SWBT customer. The line number now belongs to another local service provider. | G4 | 228 |
| DENY | 299 | Failure | | LNP Only Look-Up, the NPANXX is not a portable range. | LNP | 000 |
| DENY | 301 | Denied | Y | Denied Originating Number (ANI) - The ANI has an Admin. block to automatically decline all attempts from this line number. (Admin. Reply) | G2 | 183 |
| DENY | 302 | Denied | Y | Terminating Number (DNI) has an Admin. block to automatically decline all attempts to this line number. (Admin. Reply) | G2 | 182 |
| DENY | 303 | Denied | Y | Calling card has an Admin. block to automatically decline all attempts to this line number. (Admin. Reply) | G2 | 000 |
| DENY | 304 | Denied | Y | Collect Number has an Admin. block to automatically decline all attempts to this line number. (Admin. Reply) | G2 | 000 |
| DENY | 305 | Denied | Y | Third Party Number has an Admin. block to automatically decline all attempts to this line number. (Admin. Reply) | G2 | 000 |
| DENY | 306 | Denied | Y | Commercial credit card has an Admin. block to automatically decline all attempts to this line number. (Admin. Reply) | G2 | 000 |
| DENY | 307 | Denied | Y | Group Number has an Admin. block to automatically decline all attempts from this group. (Admin. Reply) | G2 | 000 |
| DENY | 308 | Denied | Y | Global Negative Database Block - 'There is an Admin. block in the Global Negative Database to this line number for the Audiotext Industry. (Admin. Reply) | G2 | 000 |
| DENY | 309 | Denied | Y | Excessive calling card PIN hits - The threshold for bad PIN attempts for a calling card was exceeded in the Admin. fraud control system (Admin. Reply). This is the same as reply code 055. | G2 | 000 |
| DENY | 400 | Denied | | Commercial credit card, Invalid Commercial credit card - This is not a valid commercial credit card account number. It failed the MOD 10 check. Also an invalid amount, invalid date or a format error may cause this response. (Host or Admin. Reply) | | 506 |
| DENY | 401 | Denied | | Commercial credit card, Call issuer - The authorization attempt triggered a flag in the fraud control system of the issuing bank, Banknet or VISAnet. | | 507 |
| DENY | 402 | Denied | | Commercial credit card, Confiscate card - No billing is allowed to this account number. If possible confiscate this card. | | 508 |
| DENY | 403 | Denied | | Commercial credit card, Authorization Declined - No billing is allowed to this account number. | | 509 |
| DENY | 404 | Denied | | Commercial credit card, Unable to Validate Account Number - There is problem in authorizing this account number. | | 510 |
| DENY | 405 | Denied | | Commercial credit card, Card expired - No billing is allowed to this account number because the card has expired. | | 511 |
| DENY | 406 | Denied | | Commercial credit card - Invalid Merchant ID. | | 512 |
| DENY | 408 | Denied | | Commercial credit card, Invalid card and Address (zip code) - Both the account number and the address or zip code are invalid. Do not allow billing to this account number. | | 513 |

TABLE 3-continued

LIDB/LNP SOURCE TRANSLATIONS FOR ISP:

| Resp. Type In | Resp. Code In | ACTION | LIDB ADMIN? | Description | rtfc type | Code Out |
|---|---|---|---|---|---|---|
| DENY | 409 | Denied | | Commercial credit card, System Problem - There is a technical problem with the authorization system of the issuing bank, Banknet or VISAnet. | | 514 |
| DENY | 420 | Denied | | Commercial credit card, Over withdrawal limit - This account has exceeded the withdrawal threshold in the authorization system of the issuing bank | | 515 |
| DENY | 421 | Denied | | Commercial credit card, Over credit limit - This account has exceeded the credit threshold in the authorization system of the issuing bank | | 516 |
| DENY | 422 | Denied | | Commercial credit card, Lost card, Confiscate - This account number was reported lost. No billing is allowed to this account number. If possible confiscate this card. | | 517 |
| DENY | 423 | Denied | | Commercial credit card, Stolen card, Confiscate card - This card was reported stolen. No billing is allowed to this account number. If possible confiscate this card. | | 518 |
| DENY | 424 | Denied | | Commercial credit card, Invalid Pin - This means a bad PIN was used. | | 519 |
| DENY | 425 | Denied | | Commercial credit card, Allowable Number of PIN Tries Exceeded - The threshold for bad PIN attempts for a calling card was exceeded in the authorization system of the issuing bank, Banknet or VISAnet. | | 520 |
| DENY | 426 | Denied | | Duplicate transaction. The Authorization host considers this a duplicate transaction. | | 521 |

In the embodiment of the invention depicted in the drawings, regardless of the type of service provider or the type of validation request, clients or vendors may need a profile so that the process or method carried out by the system 10 knows how to treat the request. The client or vendor profile may be set up in a database, which includes the indicators that are set for the type and tests for each request, which will be subsequently received from the vendor.

The first table shows the operations in the BTN test descriptions process. In one exemplary embodiment, a set of core tests is run for each client. Additionally, clients may have some configuration options to identify the tests that best fit their program.

| PROCESS | TESTs | PURPOSE |
|---|---|---|
| | | BILLABLE BTN TESTs |
| VAL/Pre-bill | Client profile | Client profile for each id for BTN validation process test flags. |
| VAL only | ANI = BTN | Determines if originating number = BTN input by caller. |
| VAL/Pre-bill | Invalid # OFFNET | Ids Invalid NPAs & NXXs |
| VAL/Pre-bill | Global OFFNET | Ids (NPA)NXX & OCN combinations where there is not a B&C agreement |
| VAL/Pre-bill | Product OFFNET | Ids (NPA)NXX & OCN combinations where the traffic type is riot approved to bill (Jul. 24, 2001: MRC only for NECA and Illuminet Only) |
| VAL/Pre-bill | Client OFFNET | Ids (NPA)NXX & OCN combinations where there the Client id (7###) is not approved to bill |
| VAL/Pre-bill | Special Calling Card OFFNET | Ids (NPA)NXX & OCN combinations of special calling card #s for non-calling card traffic that are unable to be billed |
| VAL/Pre-bill | Plan OFFNET | Ids (NPA)NXX & OCN combinations where a Client Plan is not approved to bill |
| VAL/Pre-bill | ONNET | Ids (NPA)NXX & OCN combinations where there are B&C agreements |
| VAL/Pre-bill | CLEC | Ids (NPA)NXX-xxxx's are not billable due to CLEC for all Clients. |
| VAL/Pre-bill | 4250 BLOCK | Ids (NPA)NXX-xxxx's that have a 4250 billing block (for MRC only) |
| VAL/Pre-bill | UNBILL | Ids (NPA)NXX-xxxx's that have unbilled previously for all Clients |

-continued

| PROCESS | TESTs | PURPOSE |
|---|---|---|
| VAL/Pre-bill | Block & Cancel - GLOBAL | Ids (NPA)NXX-xxxx's that requested a Block and/or Cancel; usually institutional |
| VAL/Pre-bill | Block & Cancel - Client Specific | Ids (NPA)NXX-xxxx's that requested a Block and/or Cancel for a particular Client id |
| VAL/$1^{st}$ + n Pre-bill | Val Code Cache | Ids (NPA)NXX-xxxx & Return Code combinations for previous request |
| VAL/$1^{st}$ Pre-bill | LIDB Validity Test | To determine the billable status of the return code from the LIDB dip |
| VAL/$1^{st}$ Pre-bill | LIDB CLEC RAO | Ids RAOs that belong to CLECs |
| VAL/$1^{st}$ Pre-bill | LIDB CLEC OCN | Ids known CLEC OCNs |
| VAL/$1^{st}$ Pre-bill | LIDB State Specific Conversion | To determine if the returned LIDB code is a state specific code and then a conversion to the billable OCN for the ONNET check |
| VAL/$1^{st}$ Pre-bill | LIDB ONNET | Ids billable (NPA)NXX & returned OCN combinations |
| ALL | VAL Trans Log | Log of each validation request and response by Client ID |
| | | BTN CREDIT SCORING |
| VAL/Pre-bill | AREA CODE Change indicator | Provides the new area code for the line number while in permissive dialing period. |
| Val | ZIP MATCH | ZIP matches zip codes for (NPA) NXX (not in production as of 6/01) |
| VAL/Pre-bill | ANI WATCH - CLIENT (SOURCE: all) | (NPA)NXX-xxxx's where there a refund/chargeback has been issued previously for this Client ID |
| VAL/Pre-bill | ANI WATCH - CLIENT (SOURCE: client) | (NPA)NXX-xxxx's where there a refund has been issued previously for this Client ID |
| VAL/Pre-bill | ANI WATCH - CLIENT (SOURCE: ebi/telco) | (NPA)NXX-xxxx's where there a chargeback/bad debt has been issued previously for this Client ID |
| VAL/Pre-bill | ANI WATCH - GLOBAL (SOURCE: all) | (NPA)NXX-xxxx's where there a refund/chargeback/bad debt has been issued previously from CLIENT, ebi or telco |
| VAL/Pre-bill | ANI WATCH - PRODUCT (SOURCE: all) | (NPA)NXX-xxxx's where there a refund/chargeback/bad debt has been issued previously for the same product |
| VAL | Address Verification | Not Available |
| | | Example TESTs |
| VAL/Pre-bill | Threshold by Client | Determines whether the BTN has met a Client specific threshold |
| VAL/Pre-bill | LEC PROV feed | To determine if LEC owns Acct |
| VAL/Pre-bill | Credit Check | Credit header files check from Credit source |
| VAL/Pre-bill | New within 90 days | Determines if BTN is less than 90 days old; affects credit score |

On/Offnet Family Tables (Billing Coverage)

The OFFNET table family contains OCN & NPA_NXX combinations where billing is not approved. If found, the BTN does not continue on the validation path.

The ONNET table determines if an NPA_NXX & OCN combination can be found among the billable combinations. In this case a match allows the BTN to move further on the validation path. A no match will return a failure.

The CLEC table consists of CLECs that the proprietor, or user of the system 10, does not have billing contracts with. This table is specific to the line number. Sources dictate the fields that will be present for the record. A match here is considered a fail and does not continue.

The 4250 Block table consists of specific line numbers that cannot be billed for 4250-01 record types. A match in this table stops the validation movement.

Bill Control Family Tables

The Unbills or unbillable table holds all the BTNs that have been sent to a subscribers' bill page but could not be placed on the bill page for various reasons. A match here halts the validation sequence for the subject BTN.

Block and cancel tables identify BTNs that have requested a permanent or a Client specific block for billing. A match sends a failed response.

Validation Cache is a table that holds responses in order not to process duplicates (e.g. Submit pressed 10 times). A match here will return the code stored from a previous request.

LIDS Family Tables

LIDB is a third party that supplies information to the phone line number level. The goal is to test and store as many relevant fields as can be requested in a transaction.

The LIDB Validity Table translates the LIDB code into a billable or non-billable response according to predefined business rules. A fail here will halt the validation for the request.

The State specific table is a conversion from a true OCN to a known State Specific OCN that is billable. A match here will trigger the conversion, the BTN continues in the validation process.

The transaction log is the history of each transaction request and response that is processed through the validation system.

The TPM indicates that an NPA is in the permissive dialing period. A match here appends the record with the updated number for a record update.

The ANI Watch has BTNs that have been given an adjustment for charges by the Client, proprietor or user of the system 10 or the Telco. This is to help the client determine the credit score for the BTN.

Unlike the conventional use of the LIDB database that uses the LIDB data to obtain information on a destination/termination or recipient location or subscriber unit, the system 10, in one exemplary embodiment, uses the industry standard LIDB database to obtain relevant information on the initiating subscriber line. The subscriber line reference data obtained from the LIDB database is then processed to generate modified validity codes, which provide a vendor with data to facilitate deciding whether or not a transaction should be processed. The LIDB/LNP database may be queried as if a collect call event is occurring and a call is thus mimicked. The processing of the transaction, in one exemplary embodiment, involves communicating the relevant transaction data to a folder of the subscriber with a relevant Telco. The method of, and system 10 for, validating the billing account associated with the subscriber line allows, for example, a subscriber line to be used to validate and conclude a transaction instead of using a conventional payment techniques such as a credit card, debit card, bank account details or the like.

A current industry-wide problem is the lack of ability of a service provider to identify when a line subscriber has switched his service to a CLEC since the service provider may not have an existing billing arrangement with such a CLEC and may also not have a source for the BNA to allow for a direct billing solution. LNP databases were originally established for the purpose of directing call routing activities among facilities-based carriers and most telephone numbers ported to a CLEC do not involve a facility change (i.e. the CLEC is simply reselling the incumbent LEC's facilities). This means that, for billing decision purposes, LNP queries may provide an incorrect response.

In one embodiment of the present invention, the LNP queries have been enhanced by analyzing and interpreting other field elements included within the query response. Specifically, certain values or, in some cases, the absence of certain values, in the Operating Company Number ("OCN") and/or the Regional Accounting Office ("RAO") fields, allows further accuracy in the validation response. While the definitions of the OCN and RAO field elements can be obtained from industry sources, their interpreted use in the validation process is unique to the present invention. Use of these additional data elements can improve the reliability of the validation event.

In addition, the present invention may include supplementing LNP results with CARE queries in LEC regions where LNP results are inadequate and CARE costs are not otherwise prohibitive based on the retail price of the underlying service. CARE may provide a reliable result on CLEC-ported numbers since its basic purpose is to provide subscriber account information (such as billing name and address). Once a number is ported to a CLEC, the incumbent LEC no longer has subscriber responsibility and will, therefore, return an "unavailable" response, even if the LEC's dial-tone facility is still being utilized. This negative response is then used to generate a "deny" status on the subscriber based on the current lack of CLEC billing support.

The exemplary embodiment of the present invention may supplement the validation process through the use of internal databases built from information gathered throughout the billing and collection process and process logic gleaned from previous billing experience.

It is important to appreciate that all of the operations in the method executed by the system 10 need not be executed in real-time. In one exemplary embodiment, after the approval code 000 has been generated by the system 10 at operation 134, the system 10 terminates its pre-validation check routine as shown at operation 136. At this point the system 10 may merely provide pre-validation data or verification data to indicate to the vendor 12 whether or not the subscriber line is billable. Thus the system 10 may, in a first interaction with the vendor 12 provide pre-validation data, and in a second interaction process billing information. During the processing of billing information the validation process may once again be executed. In certain embodiments, the first interaction may be in the form of a registration process during which the validation procedure is carried out to register a subscriber line. The vendor may then conduct numerous transactions with subscriber and subsequent validation checks on the subscriber line may then only be carried out on a periodic basis.

After the validation code has been sent to the vendor 12, and the pre-validation procedure has been completed, the system 10 then carries out the fraud checks on a non real-time basis (usually during the next 48 to 72 hours) as shown in operations 140 to 144. The information obtained during the fraud control check, if necessary, is used to update the various databases. In particular, after a BTN has been successfully validated but before a billing event takes place, the CARE investigation operations 140 to 144 may be executed. In the exemplary embodiment, the system 10 is arranged to interrogate off-site CARE databases and the results of the enquiry are stored in the CARE database 46. Checks on the data received from the CARE databases are then performed; whereafter one or more of the other databases may be updated with the results. For example, the CARE database may be updated with new within 90 days information, business indicator information, or the like. In the exemplary embodiment, CARE codes 2618 and 2619 indicate that the BNA is not available and that the LEC no longer owns the account.

The updating of the databases following the CARE investigation may allow enhanced future checks by the system 10 in a subsequent pre-validation procedure or subsequent registration validation event. The updated information may be provided to the vendor 12. However, if the BTN information returned from the CARE database does not meet predefined criteria, the other databases of the system 10 may not be updated.

In the embodiment described above, information on the subscriber line 17 is forwarded by the service provider or vendor 12 to the system 10 for validation. However, in other embodiments of the invention, the consumer or customer 11 may call the system 10 directly, as shown by line 150 in FIG. 5, and the ANI may then be obtained by the system 10 directly from the customer 11 and not indirectly from the vendor 12. Further subscriber line data, e.g. BTN, address of the customer 11 and so on, may then also be obtained directly from the customer 11. For example, the customer 11 may have appropriate software installed on his/her PC which allows the customer 11 to dial into the system 10 in an automated fashion should he/she wish to charge any requested goods or services to his/her subscriber account. The system 10 would then validate the subscriber line number 17 using the method described above. The system 10 then typically communicates a validation code (e.g. corresponding to approval non-approval) to the vendor 12 as shown by line 152. The vendor 12 would then conclude the transaction with the customer 11 if the subscriber line has been validated.

The proprietor or user of the system 10 may function as a type of clearing house. In particular, the proprietor or user of the system 10 may be responsible or accountable for payment for the goods or services for each transaction to the service provider or vendor 12 and, in turn, receive payment from the Telco 13. As mentioned above, the system 10 may update the telephone bill or account of the subscriber in an automated fashion (see line 154) and the account that the subscriber or customer 11 receives (see FIG. 6 and line 156 in FIG. 5) includes the charges for the goods and/or services provided by the vendor 12. The customer 11 may pay the Telco 13 (see line 155), the Telco 13 may pay the system 10 (see line 156), and the system 10 may pay the vendor 12 (see line 160). It is important to appreciate that these payments need not take place at the same time. In one exemplary embodiment, the payments between the Telco and the system 10, and the system 10 and vendor 12, take place periodically in a batch fashion, causing the machine to perform any one of the methodologies discussed above, may be executed.

Figure 7:
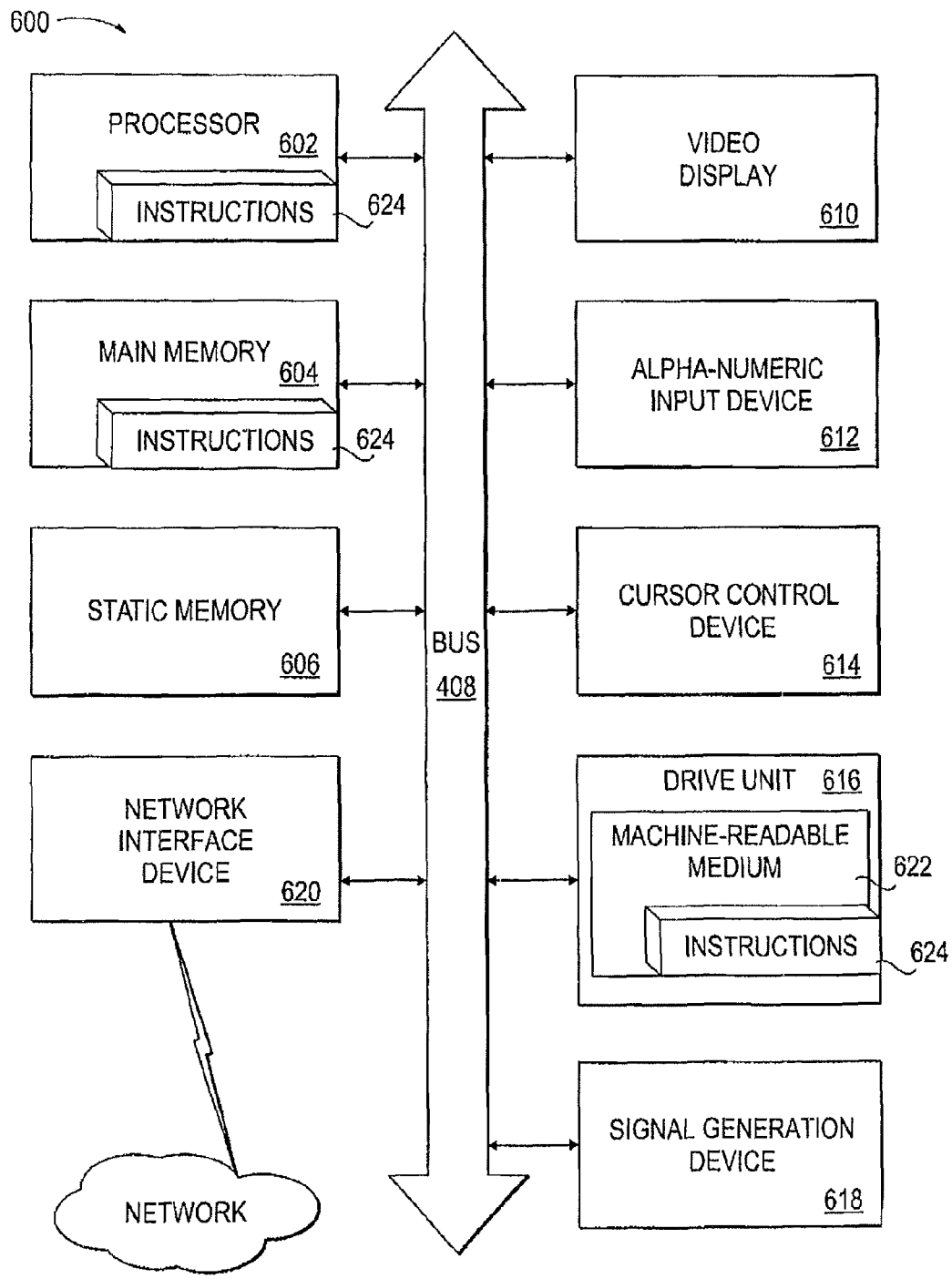
FIG. 7 shows a diagrammatic representation of machine in the exemplary form of a computer system within which a set of instructions, for causing the machine to perform any one of the methodologies discussed herein, may be executed.

FIG. 7 shows a diagrammatic representation of machine in the exemplary form of a computer system 600 within which a set of instructions, for causing the machine to perform any one of the methodologies discussed above, may be executed.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored a set of instructions (software) 624 embodying any one, or all, of the methodologies or functions described herein. The software 624 is also shown to reside, completely or at least partially, within the main memory 604 and/or within the processor 602. The software 624 may further be transmitted or received via the network interface device 620. For the purposes of this specification, the term "machine-readable medium" shall be taken to include any medium that is capable of storing, encoding or carrying a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system to validate data associated with a subscriber line of a telecommunication network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    obtaining a telephone number associated with a subscriber account of a telecommunications network;
    obtaining first reference subscriber data associated with a subscriber, said first reference subscriber data being different from the telephone number;
    accessing a first database location using the telephone number to determine second reference subscriber data;
    comparing the first reference subscriber data and the second reference subscriber data; and
    verifying an identity of the subscriber if the first reference subscriber data corresponds to the second reference subscriber data.

2. The method of claim 1, further comprising, prior to the verifying, accessing a second database location using the telephone number to determine that the subscriber account associated with the telephone number is billable.

3. The method of claim 1, further comprising:
    receiving a transaction amount to be charged to the subscriber account; and
    in response to the verifying of the identity of the subscriber, approving the transaction.

4. The method of claim 1, wherein the transaction is for a good or a service unrelated to use of a subscriber line associated with the subscriber account.

5. The method of claim 4, wherein the transaction is for a good or a service, the good or the service being selected from the group consisting of an online game, music and software.

6. The method of claim 1, wherein the telephone number is obtained from a merchant of goods or services.

7. The method of claim 1, wherein the first reference subscriber data is obtained from a merchant of goods or services.

8. The method of claim 1, wherein the first reference subscriber data is a ZIP code, PIN code, or password.

9. The method of claim 1, wherein the first database location is in a first database and the second database location is in a second database, the first database being distinct from the second database.

10. The method of claim 1, wherein the comparing of the first reference subscriber data and the second reference subscriber data comprises determining whether a match exists within a predefined range or geographic area.

11. The method of claim 1, further comprising providing a verification status notification to a merchant device via a network upon verifying the identity of the subscriber.

12. The method of claim 2, wherein determining that the subscriber account associated with the telephone number is billable comprises determining whether the subscriber account has reached a maximum monetary amount.

13. The method of claim 2, wherein determining that the subscriber account associated with the telephone number is billable comprises determining whether a billing block has been imposed on the subscriber account.

14. The method of claim 1, wherein the method is performed in real-time.

15. The method of claim 1, further comprising:
    receiving a monetary amount from a merchant of a sales transaction between the merchant and the subscriber; and
    electronically billing the monetary amount to the subscriber account.

16. The method of claim 1, wherein accessing the first database location and the second database location comprises requesting a search of at least one database.

17. The method of claim 1, wherein the telecommunications network is a wireless telecommunications network and the telephone number is a wireless number.

18. A non-transitory machine-readable medium for storing a set of instructions that, when executed by a machine, cause the machine to:
  obtain a telephone number associated with a subscriber account of a telecommunications network;
  obtain first reference subscriber data associated with a subscriber, said first reference subscriber data being different from the telephone number;
  access a first database location using the telephone number to determine second reference subscriber data;
  compare the first reference subscriber data and the second reference subscriber data; and
  verify an identity of the subscriber if the first reference subscriber data corresponds to the
  second reference subscriber data.

19. A system comprising:
  a network interface device to receive:
    a telephone number associated with a subscriber account of a telecommunications network, and first reference subscriber data associated with the subscriber account, the first reference subscriber data being different from the telephone number; and
  a processor to execute instructions stored in memory, the instructions comprising:
    accessing a first database location using the telephone number to determine second reference subscriber data, and comparing the first reference subscriber data to the second reference subscriber data to verify an identity of the subscriber based on the comparison.

20. The system of claim 19, wherein the telecommunications network is a wireless telecommunications network and the telephone number is a wireless number, and the transaction is for a good or a service unrelated to use of a subscriber wireless line associated with the subscriber account.

* * * * *